(12) United States Patent  
Yang

(10) Patent No.: US 11,216,948 B2  
(45) Date of Patent: Jan. 4, 2022

(54) SYSTEM AND METHOD FOR PROCESSING COLON IMAGE DATA

(71) Applicant: SHANGHAI UNITED IMAGING HEALTHCARE CO., LTD., Shanghai (CN)

(72) Inventor: Chunshan Yang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 429 days.

(21) Appl. No.: 16/023,307

(22) Filed: Jun. 29, 2018

(65) Prior Publication Data

US 2019/0096064 A1     Mar. 28, 2019

Related U.S. Application Data

(63) Continuation of application No. PCT/CN2017/104120, filed on Sep. 28, 2017.

(51) Int. Cl.  
    *G06K 9/00*     (2006.01)  
    *G06T 7/11*     (2017.01)  
    (Continued)

(52) U.S. Cl.  
    CPC .............. *G06T 7/11* (2017.01); *G06T 7/0012* (2013.01); *G06T 11/008* (2013.01); *G06T 11/60* (2013.01); *G06T 2207/30028* (2013.01)

(58) Field of Classification Search  
    CPC ....... G06T 7/11; G06T 7/0012; G06T 11/008; G06T 11/60; G06T 2207/30028  
(Continued)

(56) References Cited

U.S. PATENT DOCUMENTS 5,548,694 A * 8/1996 Gibson ................... G06T 15/10  
                                                     345/424  
8,155,479 B2 * 4/2012 Hoffman ................ A61B 34/37  
                                                     382/276

(Continued)

FOREIGN PATENT DOCUMENTS

CN     103106348 A     5/2013  
CN     103943017 A     7/2014  
(Continued)

OTHER PUBLICATIONS

Jang, Jongseong, et al. "Experimental study on restricting the robotic end-effector inside a lesion for safe telesurgery." Minimally Invasive Therapy & Allied Technologies 24.6 (2015): 317-325. (Year: 2015).*

(Continued)

*Primary Examiner* — Jonathan S Lee  
(74) *Attorney, Agent, or Firm* — Metis IP LLC

(57) ABSTRACT

Systems and methods for processing colon image data are provided. Image data related to a first ROI may be obtained, wherein the first ROI may include a soft tissue represented by a plurality of voxels, and each voxel may have a voxel value. A first virtual scene may be visualized based on the image data, wherein the first virtual scene may reveal at least one portion of the first ROI. A collision detection may be performed between at least one portion of the first ROI and a virtual object in the first virtual scene. A feedback force may be determined from at least one portion of the first ROI based on the collision detection. At least one of the plurality of voxels corresponding to a second ROI may be determined based on the feedback force, wherein the second ROI may relate to the soft tissue in the first ROI.

20 Claims, 11 Drawing Sheets

(51) Int. Cl.
*G06T 7/00* (2017.01)
*G06T 11/00* (2006.01)
*G06T 11/60* (2006.01)

(58) Field of Classification Search
USPC .......................................................... 382/131
See application file for complete search history.

(56) References Cited

U.S. PATENT DOCUMENTS

| | | | | |
|---|---|---|---|---|
| 10,394,327 | B2* | 8/2019 | Chizeck | .................. G06F 3/016 |
| 2009/0063118 | A1* | 3/2009 | Dachille | ............... G06F 19/325 |
| | | | | 703/11 |
| 2015/0254422 | A1* | 9/2015 | Avisar | ..................... H04L 67/10 |
| | | | | 703/11 |

FOREIGN PATENT DOCUMENTS

| | | |
|---|---|---|
| CN | 105303605 A | 2/2016 |
| CN | 106890024 A | 6/2017 |
| CN | 107080586 A | 8/2017 |
| WO | 2007019546 A2 | 2/2007 |

OTHER PUBLICATIONS

Zhang, Qi, Roy Eagleson, and Terry M. Peters. "Volume visualization: a technical overview with a focus on medical applications." Journal of digital imaging 24.4 (2011): 640-664. (Year: 2011).*
International Search Report in PCT/CN2017/104120 dated Jun. 21, 2018, 4 pages.
Written Opinion in PCT/CN2017/104120 dated Jun. 21, 2018, 4 pages.

* cited by examiner

SYSTEM AND METHOD FOR PROCESSING COLON IMAGE DATA

CROSS-REFERENCE TO RELATED APPLICATIONS

This application is a continuation of International Application No. PCT/CN2017/104120 filed on Sep. 28, 2017, the entire contents of which are hereby incorporated by reference.

TECHNICAL FIELD

The present disclosure generally relates to an image processing system, and more particularly, relates to a system and method for determining a region of interest (ROI) from a medical image.

BACKGROUND

With the development of computer science and information technology, the virtual endoscopic technique is widely used in clinical detection and diagnosis. The virtual endoscopic technique may reconstruct a virtual scene (also referred to a realistic image) with respect to an object based on image data generated by a scanning device, for example, a CT, a PET, etc. The virtual scene with respect to the object may assist a user (e.g., a doctor, a technician, etc.) to diagnose a disease according to a difference between the object and other tissues or organs represented in the virtual scene. It is desirable to provide systems and methods for improving the authenticity of the virtual scene and the accuracy of auxiliary diagnosis.

SUMMARY

One aspect of the present disclosure relates to a method for processing image data. The method may be implemented on at least one machine each of which has at least one processor and one storage. The method may include one or more of the following operations. Image data related to a first ROI may be obtained, wherein the first ROI may include a soft tissue represented by a plurality of voxels, and each of the plurality of voxels may have a voxel value. A first virtual scene may be visualized based on the image data, wherein the first virtual scene may reveal at least one portion of the first ROI. A collision detection may be performed between the at least one portion of the first ROI and a virtual object in the first virtual scene. A feedback force may be determined from the at least one portion of the first ROI based on the collision detection. At least one of the plurality of voxels corresponding to a second ROI may be determined based on the feedback force, wherein the second ROI may be related to the soft tissue in the first ROI.

Another aspect of the present disclosure relates to a non-transitory computer readable medium storing instructions. The instructions, when executed by at least one processor, may cause the at least one processor to implement the method for processing image data. The method may include one or more of the following operations. Image data related to a first ROI may be obtained, wherein the first ROI may include a soft tissue represented by a plurality of voxels, and each of the plurality of voxels may have a voxel value. A first virtual scene may be visualized based on the image data, wherein the first virtual scene may reveal at least one portion of the first ROI. A collision detection may be performed between the at least one portion of the first ROI and a virtual object in the first virtual scene. A feedback force may be determined from the at least one portion of the first ROI based on the collision detection. At least one of the plurality of voxels corresponding to a second ROI may be determined based on the feedback force, wherein the second ROI may be related to the soft tissue in the first ROI.

A further aspect of the present disclosure relates to a system for processing image data. The system may include at least one storage medium storing a set of instructions and at least one processor in communication with the at least one storage medium, wherein when executing the set of instructions, the at least one processor may be configured to cause the system to: obtain image data related to a first ROI, the first ROI including soft tissue represented by a plurality of voxels, each of the plurality of voxels having a voxel value; visualize a first virtual scene based on the image data, the first virtual scene revealing at least one portion of the first ROI; perform a collision detection between the at least one portion of the first ROI and a virtual object in the first virtual scene; determine a feedback force from the at least one portion of the first ROI based on the collision detection; and determine at least one of the plurality of voxels corresponding to a second ROI based on the feedback force, the second ROI being related to the soft tissue in the first ROI.

A further aspect of the present disclosure relates to a system for processing image data. The system may include at least one processor and a storage configured to store instructions. The system may further include an acquiring module, a virtual scene rendering unit, a feedback force determining unit, and a ROI determining unit. The acquiring module may be configured to obtain image data related to a first ROI, wherein the first ROI may include soft tissue represented by a plurality of voxels, and each of the plurality of voxels may have a voxel value. The virtual scene rendering unit may be configured to visualize a first virtual scene based on the image data, wherein the first virtual scene may reveal at least one portion of the first ROI. The feedback force determining unit may be configured to perform a collision detection between the at least one portion of the first ROI and a virtual object in the first virtual scene, and determine a feedback force from the at least one portion of the first ROI based on the collision detection. The ROI determining unit may be configured to determine at least one of the plurality of voxels corresponding to a second ROI based on the feedback force, wherein the second ROI may be related to the soft tissue in the first ROI.

A further aspect of the present disclosure relates to a method for processing image data. The method may be implemented on at least one machine each of which has at least one processor and one storage. The method may include one or more of the following operations. Image data related to an ROI may be obtained, wherein the ROI may include a colon image represented by a plurality of voxels. A first virtual scene may be built based on the image data, wherein the first virtual scene may reveal at least one portion of the ROI. The first virtual scene may be displayed by a reality display device. User interaction information associated with the first virtual scene may be acquired from an interaction device. A second virtual scene may be rendered based on the user interaction information and the image data.

A further aspect of the present disclosure relates to a non-transitory computer readable medium storing instructions. The instructions, when executed by at least one processor, may cause the at least one processor to implement the method for processing image data. The method may include one or more of the following operations. Image data related to an ROI may be obtained, wherein the ROI may include a colon image represented by a plurality of voxels. A first virtual scene may be built based on the image data, wherein the first virtual scene may reveal at least one portion of the ROI. The first virtual scene may be displayed by a reality display device. User interaction information associated with the first virtual scene may be acquired from an interaction device. A second virtual scene may be rendered based on the user interaction information and the image data.

A further aspect of the present disclosure relates to a system for processing image data. The system may include at least one storage medium storing a set of instructions and at least one processor in communication with the at least one storage medium, wherein when executing the set of instructions, the at least one processor may be configured to cause the system to: obtain image data related to an ROI, the ROI including a colon image represented by a plurality of voxels; build a first virtual scene based on the image data, the first virtual scene revealing at least one portion of the ROI; display the first virtual scene by a reality display device; acquire user interaction information associated with the first virtual scene from an interaction device; and render a second virtual scene based on the user interaction information and the image data.

A further aspect of the present disclosure relates to a system for processing image data. The system may include at least one processor and a storage configured to store instructions. The system may further include an acquiring module, an interacting unit, and a virtual scene rendering unit. The acquiring module may be configured to obtain image data related to an ROI, wherein the ROI may include a colon image represented by a plurality of voxels. The interacting unit may be configured to display a first virtual scene by a reality display device, and acquire user interaction information associated with the first virtual scene from an interaction device. The virtual scene rendering unit may be configured to build a first virtual scene based on the image data, wherein the first virtual scene may reveal at least one portion of the ROI, and render a second virtual scene based on the user interaction information and the image data.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 2:
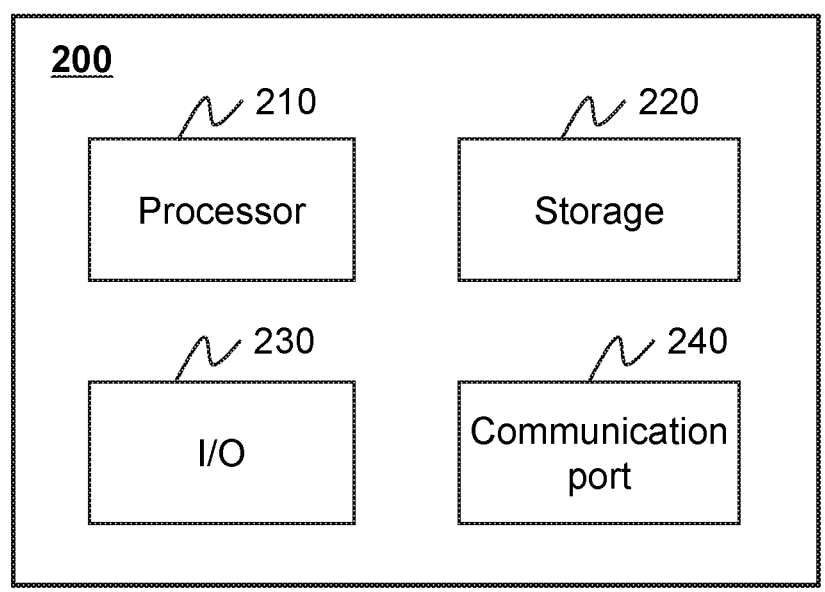
FIG. 2 is a schematic diagram illustrating exemplary hardware and/or software components of an exemplary computing device on which the processing engine 120 may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

For illustration purposes, the following description is provided to help better understanding an imaging process. It is understood that this is not intended to limit the scope of the present disclosure. For persons having ordinary skills in the art, a certain amount of variations, changes and/or modifications may be deducted under guidance of the present disclosure. Those variations, changes and/or modifications do not depart from the scope of the present disclosure.

An aspect of the present disclosure relates to an image processing system and method for recognizing and/or diagnosing an abnormal tissue in a colon. In some embodiments, an abnormal tissue (e.g., a polypus) in a colon may be pre-segmented based on one or more segmentation techniques. A virtual scene associated with the colon may be generated based on a three-dimensional reconstruction technique. A soft tissue model may be determined based on one or more biomechanical properties of the colon. In some embodiments, a feedback force associated with the pre-segmented tissue may be determined based on the soft tissue model if a collision is detected. In some embodiments, the feedback force may be transformed to a sensation signal that may be sensed by a user via a virtual reality (VR) device and assist the user to determine whether the pre-segmented tissue is an abnormal tissue.

Figure 1:
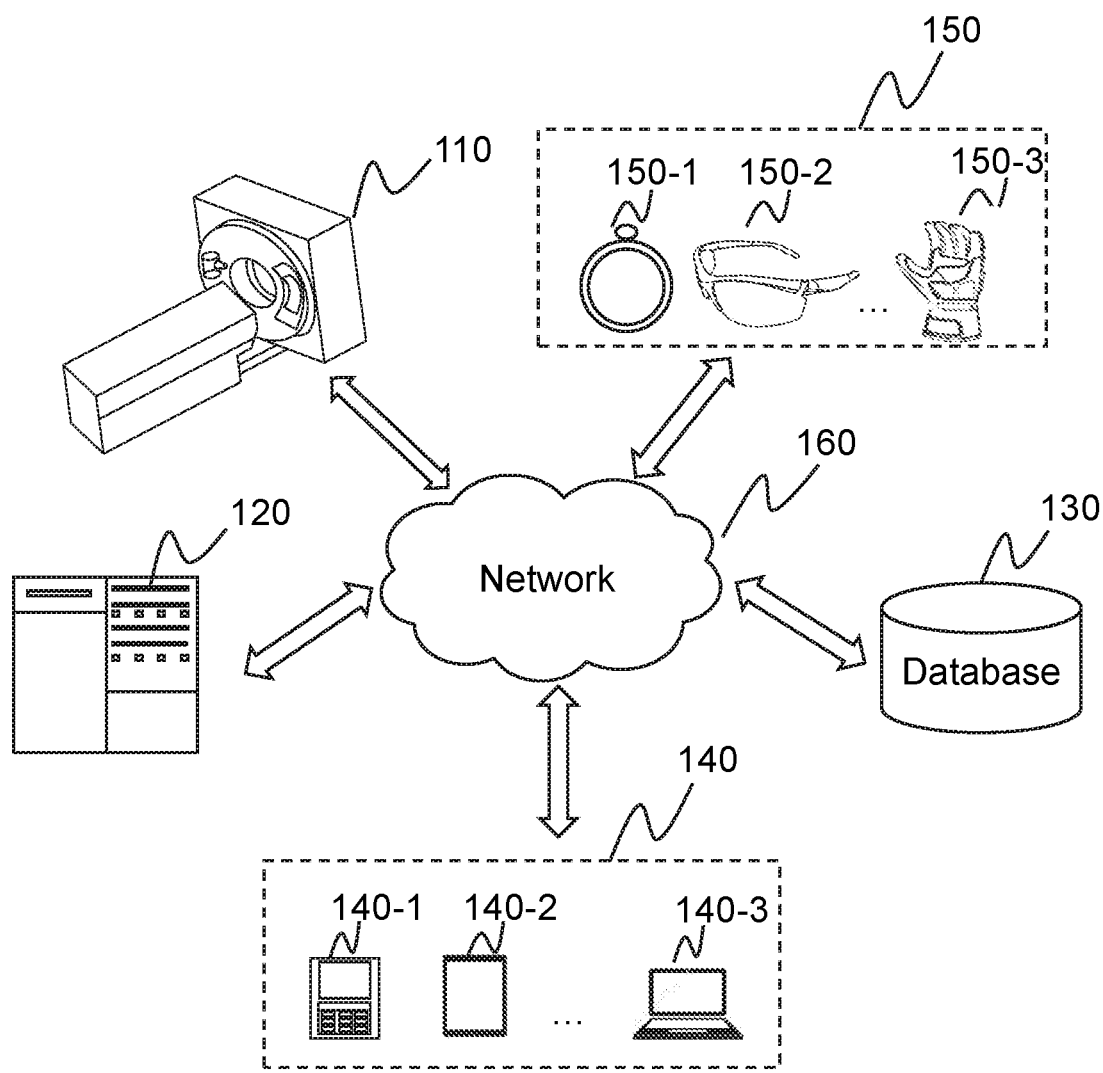
FIG. 1 is schematic diagram illustrating an exemplary imaging system according to some embodiments of the present disclosure.

FIG. 1 is schematic diagram illustrating an exemplary imaging system 100 according to some embodiments of the present disclosure. As shown, the imaging system 100 may include a scanner 110, a processing engine 120, a database 130, one or more external devices 140, one or more interaction devices 150, and a network 160. In some embodiments, the scanner 110, the processing engine 120, the database 130, the external device(s) 140, and/or the interaction device(s) 150 may be connected to and/or communicate with each other via a wireless connection (e.g., the network 160), a wired connection, or a combination thereof.

The scanner 110 may generate or provide image data via scanning a subject, or a part of the subject. The scanner 110 may include a computed tomography (CT) scanner, a computed tomography angiography (CTA) scanner, a positron emission tomography (PET) scanner, a single photon emission computed tomography (SPECT) scanner, a magnetic resonance imaging (MRI) scanner, a digital subtraction angiography (DSA) scanner, an ultrasound scanner (US), a thermal tomography (TTM) scanner, a multi-modal scanner, etc. The multi-modal scanner may include SPECT-M, CT-PET, CE-SPECT, PET-MR, PET-US, SPECT-US, TMS-MR, US-CT, US-MR, X-rays-CT, X-rays-PET, or the like, or a combination thereof.

In some embodiments, the subject may include a body, a substance, an object, or the like, or a combination thereof. In some embodiments, the subject may include a specific portion of a body, such as a head, a thorax, an abdomen, or the like, or a combination thereof. In some embodiments, the subject may include a specific organ, such as an esophagus, a trachea, a bronchus, a stomach, a gallbladder, a small intestine, a colon, a bladder, a ureter, a uterus, a fallopian tube, etc. In some embodiments, the subject may include a specific tissue, such as a tumor, a nodule, a cyst, a polypus, a calcification tissue, a damage tissue, etc. The image data may be two-dimensional (2D), three-dimensional (3D), four-dimensional (4D), or the like, or a combination thereof. The smallest resolvable element in 2D image data may be a pixel. The smallest resolvable element in 3D image data may be a voxel. In some embodiments, the scanner 110 may transmit the image data via the network 160 to the processing engine 120, the database 130, the external device(s) 140, and/or the interaction device(s) 150. For example, the image data may be sent to the processing engine 120 for further processing, or may be stored in the database 130.

The processing engine 120 may process data and/or information obtained from the scanner 110, the database 130, the external device(s) 140, and/or the interaction device(s) 150. For example, the processing engine 120 may process image data and determine a region of interest (ROI) represented in the image data. In some embodiments, the processing engine 120 may be a single server or a server group. The server group may be centralized or distributed. In some embodiments, the processing engine 120 may be local or remote. For example, the processing engine 120 may access information and/or data from the scanner 110, the database 130, the external device(s) 140, and/or the interaction device(s) 150 via the network 160. As another example, the processing engine 120 may be directly connected to the scanner 110, the external device(s) 140, and/or the database 130 to access information and/or data. In some embodiments, the processing engine 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing engine 120 may be implemented by a computing device 200 having one or more components as described in connection with FIG. 2.

The database 130 may store data, instructions, and/or any other information. In some embodiments, the database 130 may store data obtained from the processing engine 120, the external device(s) 140, and/or the interaction device(s) 150. In some embodiments, the database 130 may store data and/or instructions that the processing engine 120 may execute or use to perform exemplary methods described in the present disclosure. In some embodiments, the database 130 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the database 130 may be implemented on a cloud platform as described elsewhere in the disclosure.

In some embodiments, the database 130 may be connected to the network 160 to communicate with one or more other components in the imaging system 100 (e.g., the processing engine 120, the external device(s) 140, etc.). One or more components in the imaging system 100 may access the data or instructions stored in the database 130 via the network 160. In some embodiments, the database 130 may be a backend database of the processing engine 120.

The external device(s) 140 may be connected to and/or communicate with the scanner 110, the processing engine 120, the database 130, and/or the interaction device(s) 150. For example, the external device(s) 140 may obtain a processed image from the processing engine 120. As another example, the external device(s) 140 may obtain image data acquired via the scanner 110 and transmit the image data to the processing engine 130 to be processed. In some embodiments, the external device(s) 140 may include a mobile device 140-1, a tablet computer 140-2, a laptop computer 140-3, or the like, or any combination thereof. For example, the mobile device 140-1 may include a mobile phone, a personal digital assistance (PDA), a gaming device, a navigation device, a point of sale (POS) device, a laptop, a tablet computer, a desktop, or the like, or any combination thereof. In some embodiments, the external device(s) 140 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing engine 120 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the external device(s) 140 may be part of the processing engine 120.

The interaction device(s) 150 may facilitate a connection and/or communication between a user or an operator and other devices or engines in the imaging system 100. For example, the interaction device(s) 150 may collect user behavior information, such as movements of a body, or a portion of the body (e.g., a head, eyes, a hand, etc.), and transmit the user behavior information to other devices or engines in the imaging system 100 for further processing. As another example, the interaction device(s) 150 may obtain processed data (e.g., a reconstructed image) from, for example, the processing engine 120, and display the processed data to a user. In some embodiments, the interaction device(s) 150 may further process data. For example, the interaction device(s) 150 may process and/or convert information and/or data acquired from the scanner 110, the processing engine 120, the database 130, and/or the external device(s) 140 into a user perception. In some embodiments, the user perception may include hearing perception, touch perception, force perception, motion perception, smell perception, taste perception, or the like, or a combination thereof.

In some embodiments, the interaction device(s) 150 may include one or more smart wearable devices, such as a bracelet 150-1, eyeglasses 150-2, gloves 150-3, or others smart wearable devices, including a helmet, a watch, clothing, a backpack, a footgear, a smart accessory, or the like, or any combination thereof. In some embodiments, the interaction device(s) 150 may include a virtual reality (VR) device. The VR device may include a virtual reality helmet, virtual reality glasses, a virtual reality patch, an augmented reality helmet, augmented reality glasses, an augmented reality patch, or the like, or any combination thereof. For example, the VR device may include a Google Glass™, an Oculus Rift™, a Hololens™, a Gear VR™ etc.

The network 160 may include any suitable network that can facilitate exchange of information and/or data for the imaging system 100. In some embodiments, one or more components of the imaging system 100 (e.g., the scanner 110, the processing engine 120, the database 130, the external device(s) 140, the interaction device(s) 150, etc.) may communicate information and/or data with one or more other components of the imaging system 100 via the network 160. For example, the processing engine 120 may obtain image data from the scanner 110 via the network 160. As another example, the processing engine 120 may obtain user instructions from the external device(s) 140 via the network 160. The network 160 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, witches, server computers, and/or any combination thereof. For example, the network 160 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 160 may include one or more network access points. For example, the network 160 may include wired and/or wireless network access points such as base stations and/or internet exchange points through which one or more components of the imaging system 100 may be connected to the network 160 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the database 130 may be a data storage including cloud computing platforms, such as, public cloud, private cloud, community, and hybrid clouds, etc. In some embodiments, the external device(s) 140 and the interaction device(s) 150 may be integrated into one single device. However, those variations and modifications do not depart the scope of the present disclosure.

FIG. 2 is a schematic diagram illustrating exemplary hardware and/or software components of an exemplary computing device 200 on which the processing engine 120 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing engine 120 in accordance with techniques described herein. The computer instructions may include, for example, routines, programs, objects, components, data structures, procedures, modules, and functions, which perform particular functions described herein. For example, the processor 210 may process image data obtained from the scanner 110, the external device(s) 140, the database 130, and/or any other component of the Imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both step A and step B, it should be understood that step A and step B may also be performed by two or more different processors jointly or separately in the computing device 200 (e.g., a first processor executes step A and a second processor executes step B, or the first and second processors jointly execute steps A and B).

The storage 220 may store data/information obtained from the scanner 110, the external device(s) 140, the database 130, and/or any other component of the Imaging system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 120 for determining a regularization item.

The I/O 230 may input and/or output signals, data, information, etc. In some embodiments, the I/O 230 may enable a user interaction with the processing engine 120. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 160) to facilitate data communications. The communication port 240 may establish connections between the processing engine 120 and the scanner 110, the external device(s) 140, and/or the database 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
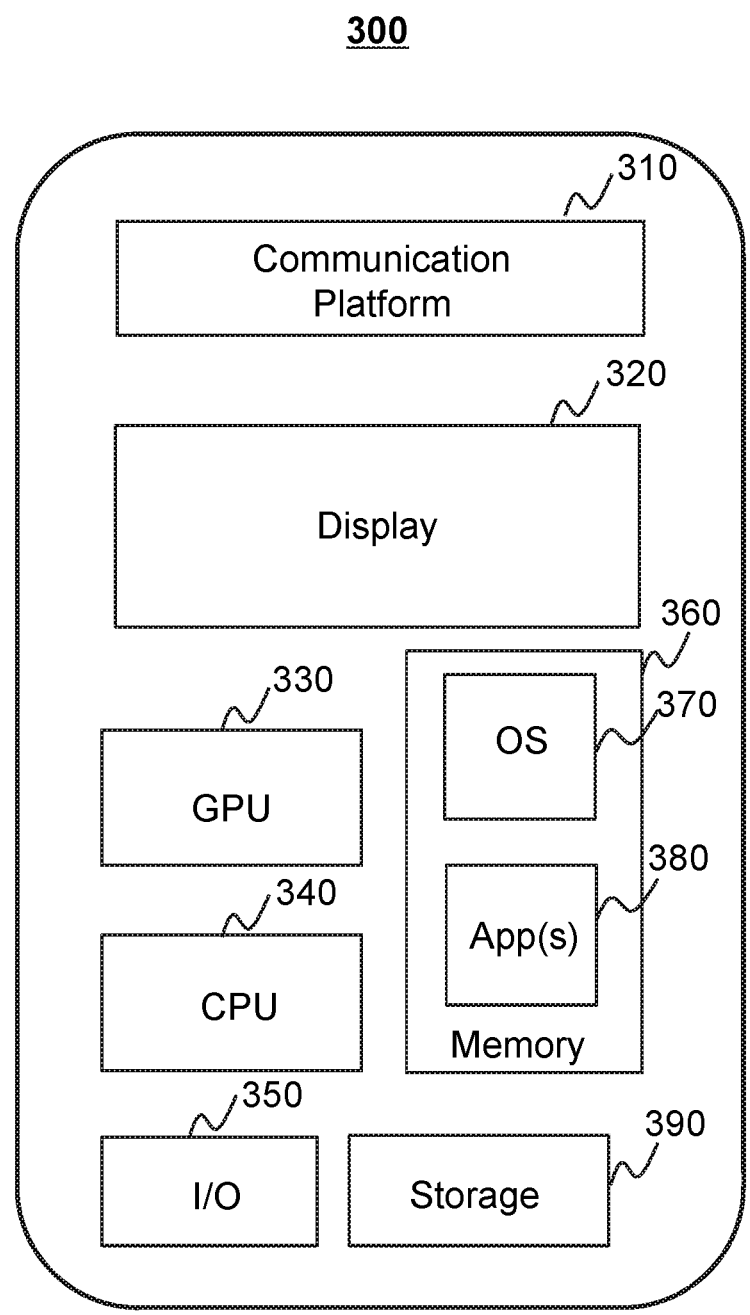
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the external device(s) 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information respect to image processing or other information from the processing engine 120. User interactions with the information stream may be achieved via the I/O 350 and provided to the processing engine 120 and/or other components of the imaging system 100 via the network 160.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or external device. A computer may also act as a server if appropriately programmed.

Figure 4:
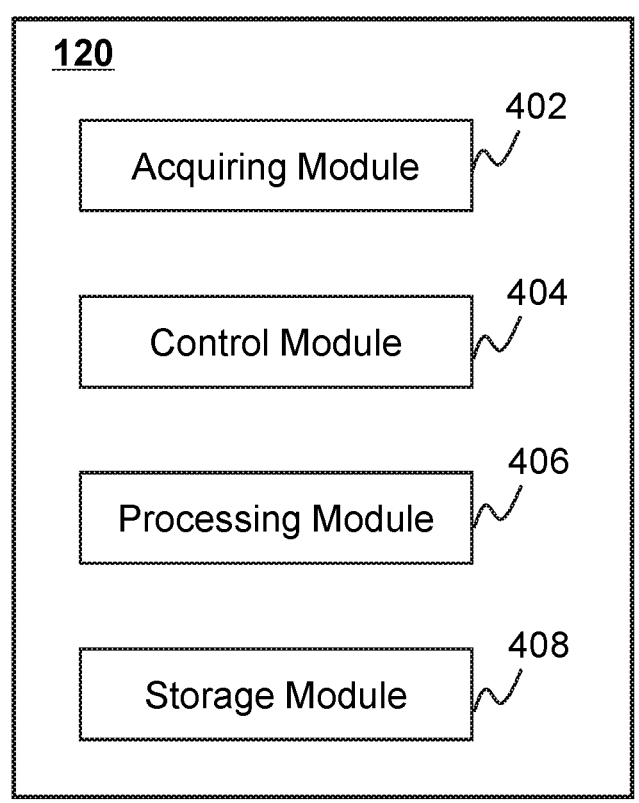
FIG. 4 is a schematic diagram illustrating an exemplary processing engine according to some embodiments of the present disclosure.

FIG. 4 is a schematic diagram illustrating an exemplary processing engine 120 according to some embodiments of the present disclosure. The processing engine 120 may include an acquiring module 402, a control module 404, a storage module 408, and a processing module 406.

The acquiring module 402 may acquire data. In some embodiments, the acquiring module 402 may acquire the data from the scanner 110, the database 130, the external device(s) 140, and/or the interaction device(s) 150. In some embodiments, the data may include image data, instructions, or the like, or a combination thereof. For example, the image data may be generated as the radiation beams (e.g., X-rays) pass through a subject. The instructions may be executed by the processor(s) of the processing engine 120 to perform exemplary methods described in this disclosure. In some embodiments, the acquired data may be transmitted to the storage module 408 to be stored.

The control module 404 may control operations of the acquiring module 402, the storage module 408, and/or the processing module 406 (e.g., by generating one or more control parameters). For example, the control module 404 may control the acquiring module 402 to acquire image data, the timing of the acquisition of the image data, etc. As another example, the control module 404 may control the processing module 406 to process image data acquired by the acquiring module 402. In some embodiments, the control module 404 may receive a real-time instruction from an operator or retrieve a predetermined instruction provided by a user (e.g., a doctor) to control one or more operations of the acquiring module 402 and/or the processing module 406. For example, the control module 404 may adjust the acquiring module 402 and/or the processing module 406 to generate one or more images of a subject according to the real-time instruction and/or the predetermined instruction. In some embodiments, the control module 404 may communicate with one or more other modules of the processing engine 120 for exchanging information and/or data.

The storage module 408 may store image data, control parameters, processed image data, or the like, or a combination thereof. In some embodiments, the storage module 408 may store one or more programs and/or instructions that may be executed by the processor(s) of the processing engine 120 to perform exemplary methods described in this disclosure. For example, the storage module 408 may store program(s) and/or instruction(s) that can be executed by the processor(s) of the processing engine 120 to acquire image data, reconstruct an image based on the image data, and/or display any intermediate result or a resultant image.

The processing module 406 may process information provided by various modules of the processing engine 120. The processing module 406 may process image data acquired by the acquiring module 402, image data retrieved from the storage module 408 and/or the database 130, etc. In some embodiments, the processing module 406 may reconstruct one or more images based on the image data according to a reconstruction technique, generate reports including the one or more images and/or other related information, and/or perform any other function for image reconstruction in accordance with various embodiments of the present disclosure. The reconstruction technique may include an iterative reconstruction algorithm (e.g., a statistical reconstruction algorithm), a Fourier slice theorem algorithm, a filtered back projection (FBP) algorithm, a fan-beam reconstruction algorithm, an analytic reconstruction algorithm, or the like, or any combination thereof. In some embodiments, the processing module 406 may render a virtual scene with respect to a subject based on image data or a reconstructed image.

In some embodiments, one or more modules illustrated in FIG. 4 may be implemented in at least part of the exemplary imaging system as illustrated in FIG. 1. For example, the acquiring module 402, the control module 404, the storage module 408, and/or the processing module 406 may be integrated into a console (not shown). Via the console, a user may set the parameters for scanning an object, controlling imaging processes, controlling the parameters for reconstruction of an image, visualizing a virtual scene associated with the object, etc. In some embodiments, the console may be implemented via the processing engine 120 and/or the external device(s) 140.

Figure 5:
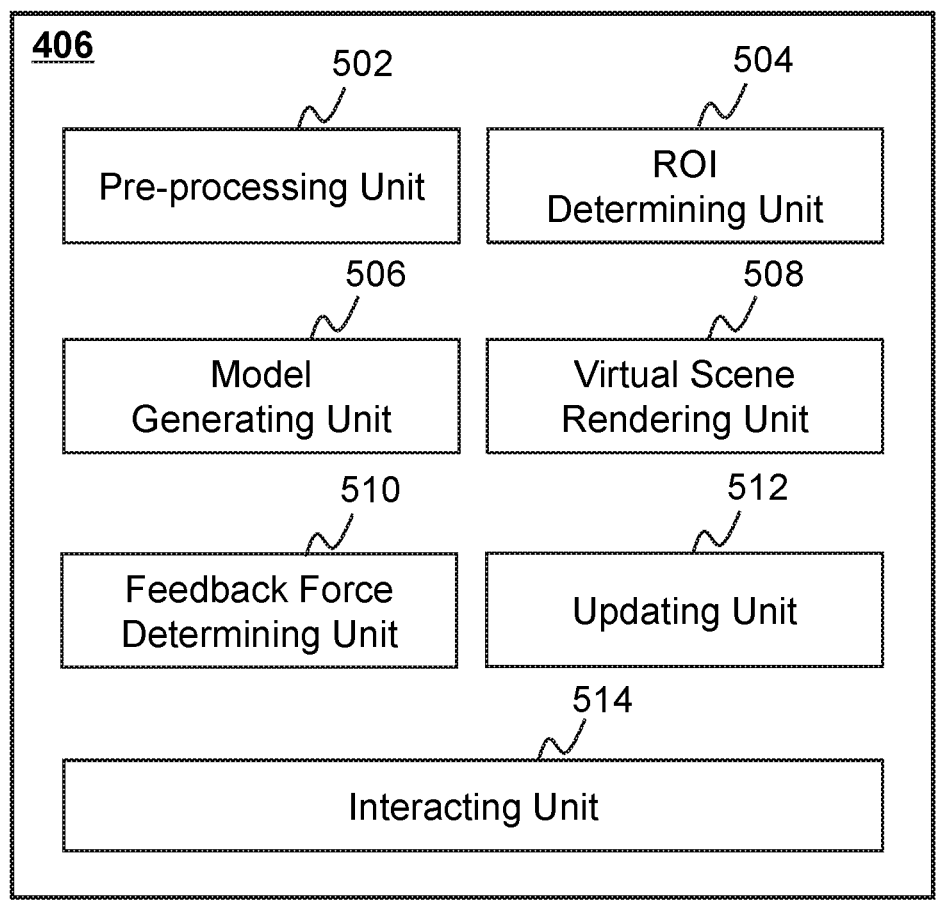
FIG. 5 is a schematic diagram illustrating an exemplary processing module according to some embodiments of the present disclosure.

FIG. 5 is a schematic diagram illustrating an exemplary processing module 406 according to some embodiments of the present disclosure. The processing module 406 may include a pre-processing unit 502, an ROI determining unit 504, a model generating unit 506, a virtual scene rendering unit 508, a feedback force determining unit 510, an updating unit 512, and an interacting unit 514. The processing module 406 may be implemented on various components (e.g., the processor 210 of the computing device 200 as illustrated in FIG. 2).

The pre-processing unit 502 may pre-process image data. The image data may be acquired by the acquiring module 402 from the scanner 110 and/or the database 130. The pre-processing operation may include an initial positioning, an image enhancement operation, an image noise reduction operation, an image smoothing operation, a normalization operation, an image segmentation operation, or the like, or a combination thereof. The pre-processing operation may be performed by using point operations, geometric operations, or the like, or a combination thereof. The point operations may include an addition operation, a subtraction operation, a multiplication operation, a division operation, etc. The geometric operations may include a translation operation, a scaling operation, a rotate operation, a distortion correction operation, etc.

In some embodiments, the pre-processed image data may be further processed by the ROI determining unit 504, the model generating unit 506, and/or the virtual scene rendering unit 508. In some embodiments, the pre-processed image data may be stored in the storage module 408 or any storage device disclosed elsewhere in the present disclosure.

The ROI determining unit 504 may determine one or more ROIs. The ROI may be a region corresponding to an object of interest represented in image data (e.g., a 2D image, or a 3D image). The ROI may be defined by a plurality of pixels or voxels represented in the image data. In some embodiments, the object may include a portion of a body (e.g., an abdomen), a specific organ or tissue (e.g., a colon), a specific tissue in a portion of a body or an organ (e.g., a polypus), etc. In some embodiments, the ROI determining unit 504 may determine a first ROI and a second ROI, and the first ROI may include the second ROI. For example, the first ROI may include a colon, and the second ROI may include a polypus in the colon. In some embodiments, the ROI determining unit 504 may determine a second ROI based on one or more feedback forces and/or one or more pre-determined second ROIs. More descriptions of the determination of the second ROI may be found elsewhere of the present disclosure. See, for example, FIG. 7 and the description thereof.

In some embodiments, the determined ROI may be further processed by the model generating unit 506 and/or the virtual scene rendering unit 508. In some embodiments, the determined ROI may be stored in the storage module 408 or any storage device disclosed elsewhere in the present disclosure.

The model generating unit 506 may generate one or more models based on an ROI with respect to an object. In some embodiments, the model may include a geometric model, a physical model, or a combination thereof. The geometric model (also referred to as "3D model") may represent geometric characteristic(s) with respect to the ROI or the object, such as a shape, a size, a texture, colors, a saturation, a contrast, a brightness, a gray value, etc. The physical model may represent physical characteristic(s) with respect to the ROI or the object, such as mass, inertia, elasticity, viscoelasticity, a strain-stress relation, deformation, motion (e.g., creep, bounce, etc.), or the like, or a combination thereof. In some embodiments, the geometric model and the physical model may be integrated into one model. For example, the physical model may be generated based on or integrated into the geometric model. In some embodiments, the model generating unit 506 may determine one or more parameters of the model(s). In some embodiments, the model determined by the model generating unit 506 may be further processed by the virtual rendering unit 508, the feedback force determining unit 510, and/or the updating unit 512. In some embodiments, the model determined by the model generating unit 506 may be stored in the storage module 408 or any storage device disclosed elsewhere in the present disclosure.

The virtual scene rendering unit 508 may build a virtual scene with respect to an object, also referred to visualizing a geometric model with respect to an ROI corresponding to the object. The virtual scene may represent characteristic information of the object in reality. In some embodiments, the characteristic information may include geometric information of the object (e.g., a color, a texture, a shape, etc.), physical information (e.g., deformation, motion, etc.), etc., as described elsewhere in the disclosure. In some embodiments, the virtual scene rendering unit 508 may build the virtual scene based on image data, such as image data acquired by the acquiring module 402, or image data pre-processed by the preprocessing unit 502, or the like. In some embodiments, the virtual scene rendering unit 508 may render the virtual scene based on one or more models (e.g., a geometric model generated by the model generating unit 506). For example, the virtual scene rendering unit 508 may render one or more virtual scenes by performing one or more visual rendering operations on a geometric model of an ROI corresponding to an object. The virtual scene rendering unit 508 may apply the geometric model with, for example, a color, an illumination, a texture, etc. In some embodiments, the virtual scene rendered by the virtual scene rendering unit 508 may be further processed by the feedback force determining unit 510, and/or the updating unit 512. In some embodiments, the virtual scene rendered by the virtual scene rendering unit 508 may be stored in the storage module 408 or any storage device disclosed elsewhere in the present disclosure.

The feedback force determining unit 510 may determine a feedback force based on a physical model determined by the model generating unit 506. In some embodiments, the feedback force determining unit 510 may perform a collision detection. In some embodiments, the feedback force determining unit 510 may perform a collision detection between one or more portions of a ROI and a virtual object in a virtual scene. In some embodiments, the virtual object may be a virtual finger, a virtual hand, a virtual arm, a virtual leg, a virtual foot, or the like, or any combination thereof. In some embodiments, the virtual object may be controlled by a real object via the interaction device 150. In some embodiments, the real object may be a portion of a human body (e.g., a finger, a hand, an arm, a leg, a foot, etc.). In some embodiments, the feedback force determining unit 510 may determine one or more collision parameters. The collision parameters may include a direction of the collision, a force of the collision, a speed of the collision, a position of the collision, etc. The collision detection may be performed to determine whether a collision happens to an ROI in the virtual scene. In some embodiments, the collision detection may be performed by the interaction device(s) 150 (e.g., a force feedback device) via applying a pressure on the ROI in the virtual scene. If a collision happens to the ROI, the ROI represented in the virtual scene may deform and/or generate a feedback force. The physical model with respect to the ROI may also deform as a result of the collision. The feedback force determining unit 510 may determine the feedback force based on the deformed physical model and the one or more collision parameters. In some embodiments, the feedback force determined by the feedback force determining unit 510 may be further processed by the updating unit 512, the interacting unit 514, and/or the virtual scene rendering unit 508. In some embodiments, the feedback force determined by the feedback force determining unit 510 may be stored in the storage module 408 or any storage device disclosed elsewhere in the present disclosure.

The updating unit 512 may update data generated by the processing module 406. In some embodiments, the data may include an ROI determined by the ROI determining unit 504, a model determined by the model generating unit 506, a virtual scene built by the virtual scene rendering unit 508, etc. For example, the updating unit 512 may update an ROI determined by the ROI determining unit 504 based on a feedback force determined by the feedback force determining unit 501. As another example, the updating unit 512 may update a virtual scene built by the virtual scene rendering unit 508 to represent a deformation of an ROI in the virtual scene when a collision happens to the ROI.

The interacting unit 514 may facilitate information and/or data exchange between a user or an operator and the processing module 406. In some embodiments, the information and/or data may include user behavior information, data generated by the processing module 406 (e.g., a virtual scene built by the virtual scene rendering unit 508), etc. In some embodiments, the user behavior information may include a voice, an emotion, an expression, a movement (e.g., a rotation of a head or eyes, a gesture, etc.), etc. In some embodiments, the user behavior detected by the interaction device(s) 150 may be transformed to user behavior information by the interacting unit 514 and/or further transmitted to the processing module 406. In some embodiments, the interacting unit 514 may display the data generated by the processing module 406 via the external device(s) 140 and/or the interaction device(s) 150. In some embodiments, the data generated by the processing module 406 may include, for example, an ROI determined by the ROI determining unit 504, a feedback force determined by the feedback force determining unit 506, a model determined by the model generating unit 506, a virtual scene built by the virtual scene rendering unit 508, etc.

It should be noted that the above description of the processing module 406 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the processing module 406 may include a storage unit, or one or more units in the processing module 406 may include an independent storage block (not shown) respectively. As another example, any two or more units may be combined as an independent unit used to implement multiple functions. As a further example, the interacting unit 514 may be unnecessary. As still a further example, any one of the units may be divided into two or more sub-units.

Figure 6:
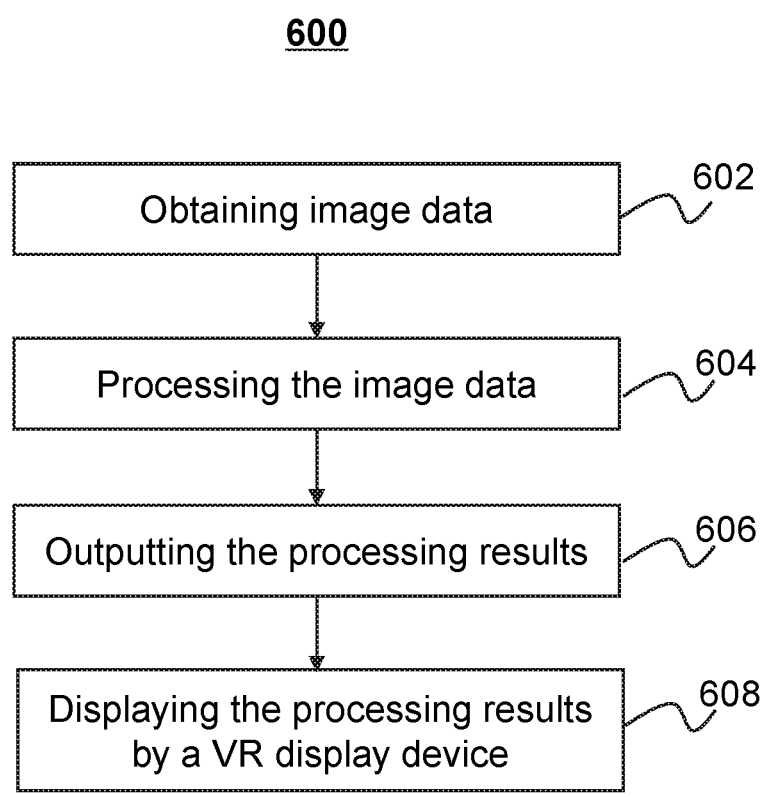
FIG. 6 is a flowchart illustrating an exemplary process for processing image data according to some embodiments of the present disclosure.

FIG. 6 is a flowchart illustrating an exemplary process 600 for processing image data according to some embodiments of the present disclosure. In some embodiments, process 600 may be performed by the processing engine 120. In some embodiments, process 600 may include obtaining image data 602, processing the image data 604, outputting the processing results 606, and displaying the processing results by a VR display device 608.

In 602, image data may be obtained. Step 602 may be performed by the acquiring module 402. In some embodiments, the image data may be obtained from the scanner 110, the database 130, or an external data source. In some embodiments, the image data may include 2D image data, a 2D image, 3D image data, a 3D image, 4D image data, a 4D image, or the like, or a combination thereof. For example, the image data may be 3D CT image data or a 3D CT image. As another example, the image data may include a series of 2D sectional images. It should be noted that an image may have corresponding image data. For example, a 2D image may have corresponding 2D image data. As another example, a 3D image may have corresponding 3D image data. As a further example, a 4D image may have corresponding 4D image data. In some embodiments, the image data may include scanning data, such as projection data with respect to a subject.

In 604, the image data obtained in 602 may be processed. Step 604 may be performed by the processing module 406. In some embodiments, the processing may include determining one or more ROIs based on the image data. In some embodiments, the ROI may be a region corresponding to an object represented by the image data. For example, the ROI may include a head, a thorax, an abdomen, or the like, or a combination thereof. As another example, the ROI may include a specific organ or tissue, such as an esophagus, a trachea, a bronchus, a stomach, a gallbladder, a small intestine, a large intestine, a bladder, a ureter, a uterus, a fallopian tube, etc. As a further example, the ROI may include a specific tissue in an organ, such as a tumor, a nodule, a cyst, polypus, a calcification tissue, a damage tissue, etc. In some embodiments, the processing may include determining a model of the ROI. The model may include a geometric model, a physical model, or a combination thereof as described elsewhere in the disclosure. In some embodiments, the processing may include rendering a virtual scene associated with the ROI. In some embodiments, the processing may include determining a feedback force generated from the ROI based on a collision that happens to the ROI in the virtual scene. In some embodiments, the processing may include determining or diagnosing an abnormal tissue in the ROI. For example, a polypus may be diagnosed in a colon.

In 606, the processed result(s) may be outputted. Step 606 may be performed by the processing module 406. In some embodiments, the processed result(s) may include whether the image data include an abnormal region (e.g., an abnormal tissue), a position of the abnormal region, etc. In some embodiments, the processed results may be outputted to and/or stored in the storage module 406, and/or the database 130. In some embodiments, the processed results may be outputted to the external device(s) 140 (e.g., the mobile device 140-1, the tablet computer 140-2, the laptop computer 140-3, etc.), the interaction device(s) 150 (e.g., the bracelet 150-1, the eyeglasses 150-2, the gloves 150-3, etc.), etc. In some embodiments, a user may sense the processed results via the interaction device(s) 150. For example, the user may sense a feedback force generated in 604 via a force feedback device. The force feedback device may impose the feedback force to the user. The force feedback device may be the bracelet 150-1, the gloves 150-3, etc.

In 608, the processed results may be displayed by a VR display device. Step 608 may be performed by the interacting unit 514. In some embodiments, the processed results may include a virtual scene representing the ROI. In some embodiments, a first image in a first eye view with respect to the ROI and a second image in a second eye view with respect to the ROI may be determined, and then the virtual scene may be displayed based on the first image and/or the second image. More descriptions of the displaying of the virtual scene may be found elsewhere in the present disclosure. See, for example, FIG. 10 and the description thereof. The virtual scene may be displayed by the VR display device, such as VR glasses (e.g., the eyeglasses 150-2). In the present disclosure, "VR display device" and "reality display device" are used interchangeably. In some embodiments, the VR display device may include a head-mounted display (HMD) device, a handheld device (e.g., a mobile phone, a tablet computer), a smart glass, etc. In some embodiments, the preprocessed results may include a feedback force generated by performing a collision on the ROI in the virtual scene. The feedback force may be outputted to the VR device, such as a force feedback device (e.g., the bracelet 150-1, gloves 150-3, etc.). In some embodiments, the VR device may convert the feedback force into a touch feeling for a user or an operator wearing the VR device.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, process 600 may include pre-processing the image data before step 604.

Figure 7:
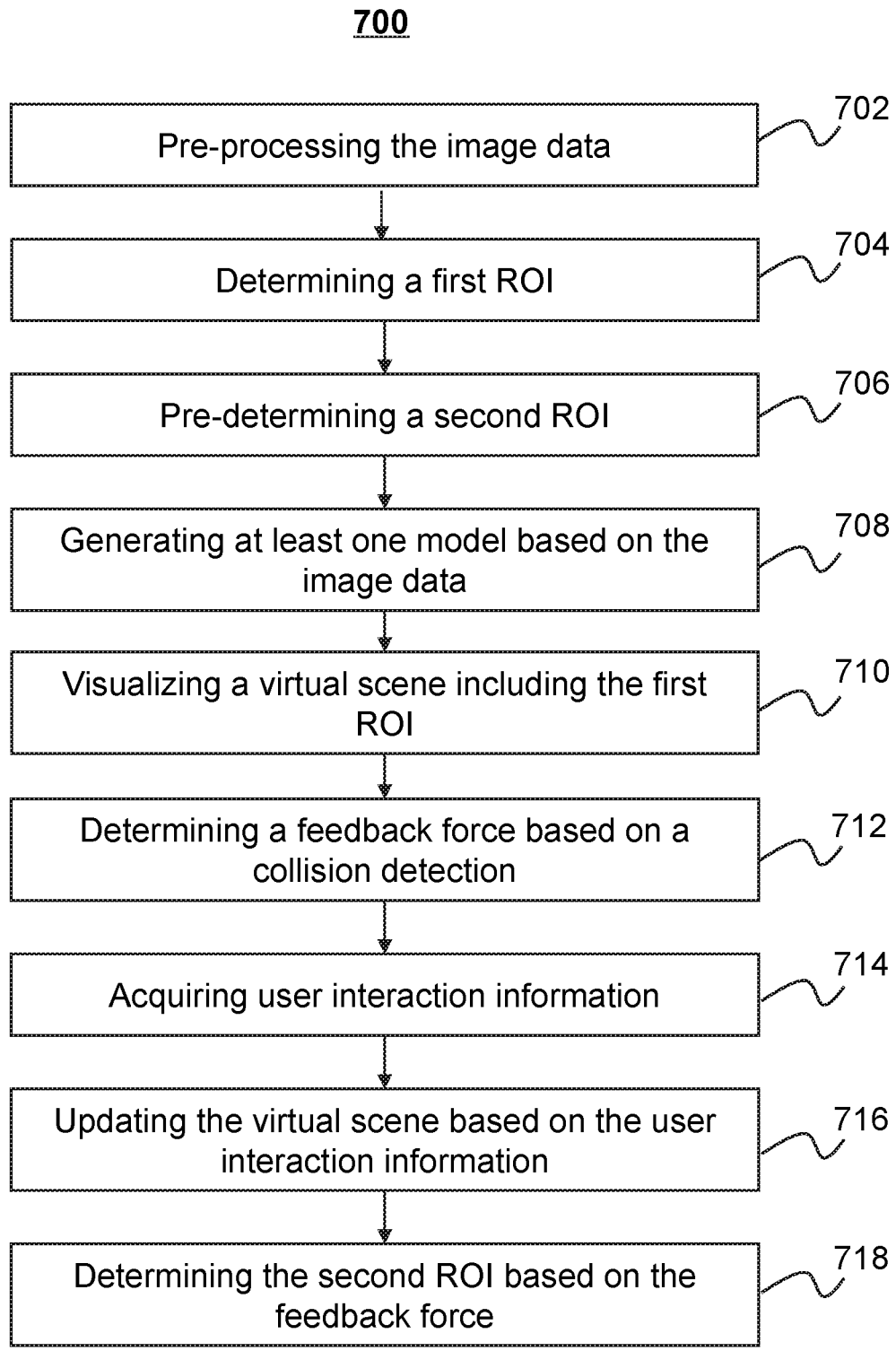
FIG. 7 is a flowchart illustrating an exemplary process for determining a region of interest (ROI) in a virtual reality (VR) scene according to some embodiments of the present disclosure.

FIG. 7 is a flowchart illustrating an exemplary process 700 for determining an ROI in a virtual reality (VR) scene according to some embodiments of the present disclosure. Process 700 may be performed by the processing module 406. In some embodiments, step 604 illustrated in FIG. 6 may be performed according to the process 700.

In 702, the image data may be pre-processed. Step 702 may be performed by the pre-processing unit 502. In some embodiments, the image data may be acquired in connection with step 602. In some embodiments, the pre-processing step may include one or more operations, for example, an initial positioning, an enhancement operation, a normalization operation, a geometric transformation, an interpolation operation, a noise reduction operation, a morphology operation, an image smoothing, or the like, or a combination thereof. In the initial positioning, a region of interest (ROI) may be identified based on the image data. In some embodiments, the initial positioning may include determining (or extracting) a center line with respect to an object represented in the image data. The center line may traverse the center of the object. In some embodiments, the center line may be far from the surface of the object in various directions. In some embodiments, the initial positioning may be performed automatically, semi-automatically, manually, or a combination thereof. For example, the center line may be determined based on one or more route extraction algorithms automatically, such as a topology thinning algorithm, a distance mapping algorithm, etc. The enhancement operation may be performed to enhance a specific area (e.g., an ROI) in an image related to the image data. The enhancement operation may include a Logarithmic transformation, a Gamma transformation, a histogram equalization, a Pseudo-color enhancement, a filtering, a gradient operation, or the like, or a combination thereof. The normalization operation may be performed to determine one or more constant parameters of the image for eliminating other transformation effects. The normalization operation may include a Min-Max scaling, a Z-score standardization, or the like, or a combination thereof. The geometric transformation may be performed to change positions of one or more pixels or voxels in the image, such as an image translation, an image rotation, an image shearing, an image scaling, an image mirroring, etc. The interpolation operation may be performed to add one or more pixels or voxels to the image, such as a nearest neighbor interpolation, a bilinear interpolation, a bicubic interpolation, a fractal interpolation, etc.

In some embodiments, in the noise reduction operation, one or more filters may be used, including a spatial-domain filter, a transform-domain filter, a morphological noise filter, or the like, or a combination thereof. The spatial-domain filter may include a field average filter, a median filter, a Gaunssian filter, or the like, or a combination thereof. The transform-domain filter may be used to perform a Fourier transform, a Walsh-Hadamard transform, a cosine transform, a K-L transform, a wavelet transform, or the like, or a combination thereof. The morphological noise filter may be used to perform an expansion operation, a corrosion operation, an open operation, a closed operation, a hit or miss transform, or the like, or a combination thereof. In some embodiments, the noise reduction operation may be performed by applying a partial differential equation or a variational technique. The partial differential equation may include a Perona equation, a Malik equation, or the like, or a combination thereof.

The morphology operation may be performed to process the image based on morphology corresponding to different regions in the image, such as an erosion operation, a dilation operation, an opening operation, a closing operation, etc. The image smoothing may be performed to smooth the brightness of the image and/or reduce the mutation gradient of the brightness.

In some embodiments, the pre-processing operation may include an image segmentation. The image segmentation may be performed to extract a region of interest (ROI) from the image data; or to classify the image data into a region of interest (ROI) and a region of no interest based on a segmentation technique. For example, in a polypus detection, an ROI may include at least one portion of a colon. A region of no interest may be the intestinal residue in the colon. In some embodiments, the region of no interest may be identified and removed from the image (also referred to herein as "purging an electronic gut"). The segmentation technique may include a region-based segmentation, an edge-based segmentation, a wavelet transform segmentation, a mathematical morphology segmentation, an artificial neural network-based segmentation, a genetic algorithm-based segmentation, or the like, or a combination thereof. The region-based segmentation may be based on a threshold segmentation algorithm, cluster analysis, region growing, or the like, or a combination thereof. The threshold segmentation algorithm may include global threshold algorithm (e.g. P-quantile algorithm, an iterative algorithm, concave histogram analysis, the Otsu's algorithm, a fuzzy set algorithm, a two-dimensional entropy thresholding algorithm, a histograms threshold technique, a relaxation algorithm, etc.), a local threshold algorithm, a multi-threshold algorithm (e.g. a wavelet-based multi-threshold algorithm, a boundary-point-based recursive multi-threshold algorithm, etc.), or the like, or a combination thereof. The cluster analysis may include a K-means algorithm, a fuzzy C-means clustering (FCM) algorithm, etc. The mathematical morphology segmentation may be based on a Hysen point enhanced model, a Hysen line enhanced model, a multiscale Gaussian template matching model, a multi-scale morphological filtering model, etc. The edge-based segmentation may be based on a differential operator (e.g. the Robert operator, the Sobel operator, the Prewitt operator, the Log operator, the Canny operator, etc.), a surface-based fitting, a boundary and surface-based fitting, a serial boundary searching, or the like, or a combination thereof.

In 704, a first ROI may be determined. Step 704 may be performed by the ROI determining unit 504. The first ROI may be identified from the image data based on a segmentation technique. The image data may be acquired as described in 602. In some embodiments, the image data may be the pre-processed image data in 702.

In some embodiments, the first ROI may be a region corresponding to a first object represented in the image data. In some embodiments, the first object may include a part of a body, such as a head, an abdomen, a thorax, or any other part. In some embodiments, the first object may include a specific organ or tissue in the head, abdomen, thorax, or any other part of the body, such as esophagus, trachea, bronchus, stomach, gallbladder, small intestine, large intestine, bladder, ureter, uterus, fallopian tube, or any other organ or tissue. In some embodiments, the first ROI may be a two-dimensional (2D) ROI. For example, the image data may include a plurality of 2D sectional images related to the first object (e.g., a colon). The first object represented by one of the plurality of 2D sectional images may be a first ROI. A first ROI may be determined in each of the plurality of 2D sectional images. Thus, a plurality of first ROIs with respect to the first object may be determined. In some embodiments, the first ROI may be a three-dimensional (3D) ROI. For example, the image data may include a 3D image related to the first object. The first object (e.g., a colon) represented in the 3D image may be the first ROI.

In some embodiments, the first ROI may be identified and/or extracted from a region surrounding the first ROI. In some embodiments, the region surrounding the first ROI may be removed from the image data. For example, the region surrounding the first ROI may have a plurality of pixels or voxels. Each pixel or voxel may have a gray value. Further, the region surrounding the first ROI may be removed by setting the gray values of the plurality of pixels or voxels associated with the region surrounding the first ROI to be 0. In some embodiments, characteristic information corresponding to the first ROI may be extracted. The characteristic information may include the gray values of pixels or voxels in the first ROI, an average gray value of the pixels or voxels in the first ROI, a texture of the first ROI, color information of the pixels or voxels in the first ROI, etc. In some embodiments, the first ROI may be determined based on a segmentation technique as described elsewhere in the disclosure.

In 706, a second ROI may be pre-determined. Step 706 may be performed by the ROI determining unit 504. The second ROI may be a region corresponding to a second object represented in the image data. In some embodiments, the second object may include a specific organ or tissue in head, abdomen, thorax, or any other part of a body, such as esophagus, a trachea, bronchus, a stomach, a gallbladder, a small intestine, a large intestine, a bladder, a ureter, a uterus, a fallopian tube, or any other organ. In some embodiments, the second object may include a specific tissue in a specific organ, such as a tumor, a nodule, a cyst, a polypus, a calcification tissue, a damage tissue, etc. In some embodiments, the first ROI may include the second ROI. For example, the first ROI may include a colon, and the second ROI may include a polypus in the colon.

In some embodiments, in the pre-determination of the second ROI, the second ROI may be identified and/or extracted roughly from the first ROI. For example, a contour of the second ROI may be determined, and the contour may encompass the second ROI. In some embodiments, the pre-determination of the second ROI may be performed automatically, semi-automatically, manually, or a combination thereof. For example, a user may draw a contour line of the second ROI using the external device(s) 140 (e.g., a mouse) manually. As another example, the second ROI may be identified based on an edge detection algorithm or a segmentation technique. A user may further modify or adjust the second ROI using the external device(s) 140 (e.g., a mouse) manually. As still another example, the second ROI may be pre-determined based on a segmentation technique as described elsewhere in the present disclosure, and the contour line of the second ROI may be extracted automatically. The segmentation technique may enhance a difference between the second ROI and the other parts of the first ROI excluding the second ROI.

In some embodiments, the second ROI may be a two-dimensional (2D) ROI. For example, the image data may include a plurality of 2D sectional images related to the second object. The second object (e.g., a polypus) represented in one of the plurality of 2D sectional images may be a second ROI. A second ROI may be pre-determined in each of the plurality of 2D sectional images. Thus, a plurality of second ROIs with respect to the second object may be pre-determined. In some embodiments, the second ROI may be a three-dimensional (3D) ROI. For example, the image data may include a 3D image related to the second object. The second object (e.g., a polypus) represented in the 3D image may be the second ROI.

In 708, at least one model may be generated based on the image data (e.g., the image data obtained in operation 602, the image data pre-processed in operation 702, etc.). In some embodiments, in 708, the at least one model may be generated based on the first ROI. Step 708 may be performed by the model generating unit 506. In some embodiments, the at least one model may be a geometric model, a physical model, or a combination thereof, as described elsewhere in the disclosure. In some embodiments, the geometric model related to the image data (or the first ROI) may be generated based on a 3D reconstruction technique. The 3D reconstruction technique may include a surface reconstruction technique, a volume reconstruction technique, or the like, or a combination thereof. The reconstruction rendering technique may be used to determine the surface of the first object with respect to the first ROI. The surface reconstruction technique may include a contour line reconstruction technique, a surface-based reconstruction technique, a voxel-based surface reconstruction technique, etc. The contour line reconstruction technique may be used to extract one or more contour lines of the first ROI(s) represented in different 2D sectional images, and then interpolate the contour line(s) for rendering the contour surface of the first object. The voxel-based surface reconstruction technique may be used to reconstruct the contour surface based on voxels in the first ROI (e.g., a 3D ROI). The surface-based reconstruction technique may be used to reconstruct the contour surface of the first object. In the reconstruction of the contour surface of the first object, one or more triangle or polygon may be used to fill the interspace of the contour lines of the first ROI(s) represented in different 2D sectional images. Using the volume reconstruction technique, a virtual light may traverse the first ROI(s) represented in different 2D sectional images. Then one or more pixels or voxels traversed by the virtual light may be analyzed, and integrated information of multi pixels traversed by the virtual light may be determined. The volume reconstruction technique may include a ray tracing/casting method, a snowball method, a shear-deformation method, etc.

The physical model may include a spring mass model, a finite element model, a boundary element model, or the like, or a combination thereof. In the spring mass model, the image data (e.g., the first ROI) may be defined as a set of mass points. Two adjacent mass points may be connected by a spring. The spring may have an elastic coefficient. The deformation of the first ROI or the second ROI may be determined based on the elastic coefficient. In the finite element model, the first ROI and/or the second ROI may be defined using a set of elastic models. The deformation of the first ROI or the second ROI may be determined based on a deformation of the elastic models. In the boundary element model, the deformation of the first ROI or the second ROI may be determined based on surface structure characteristic information of the first ROI or the second ROI, such as gray values of voxels on the surface of the first ROI or the second ROI. In some embodiments, the physical model may be used to determine a feedback. For example, when applying a pressure on a portion of the first ROI, a position represented by one or more pixels or voxels with respect to the portion may be changed, and a deformation may be generated. In some embodiments, a feedback force may be generated. The deformation and the feedback force may be determined based on the physical model corresponding to the first ROI. In some embodiments, a relationship (e.g., the relationship between the gray value and the feedback force) between the characteristic information and the behavior information may be determined based on the physical model.

In some embodiments, the geometric model and the physical model may be integrated into a single model. For example, the geometric model may be represented by a plurality of meshes. The meshes may include a series of nodes. In some embodiments, one or more node may be defined as a mass point. Two or more adjacent mass points may be connected by one or more springs. In some embodiments, a node may be a feature point. A feature point may include one or more voxels corresponding to the first ROI or the second ROI. In some embodiments, the structure, shape and/or size of the model, may be changed when removing one feature point from the model.

In 710, a virtual scene including the first ROI may be visualized. Step 710 may be performed by the virtual scene rendering unit 508. In some embodiments, one or more visual rendering operations may be performed based on the at least one model generated in 708. The visual rendering operation may generate the virtual scene including the realistic images, sounds and other sensations that replicate a real environment. In some embodiments, the visual rendering operation may include a visual transformation, a color operation, a light operation, an animation effect operation, a texture mapping operation, or the like, or a combination thereof. For example, the color operation may be performed to color the at least one model according to characteristic information of the first ROI (such as, colors of pixels or voxels). As another example, the texture mapping operation may be performed to extract the texture of the first ROI, and map the texture to the model (e.g., a model generated in 708) based on a texture mapping algorithm. In some embodiments, the texture mapping algorithm may include a Blinn algorithm, a two-step texture mapping algorithm, a linear interpolation mapping texture algorithm, or the like, or a combination thereof.

In some embodiments, the virtual scene may be rendered based on a rendering algorithm. The rendering algorithm may include a ray tracing/casting algorithm, etc. Using the ray tracing/casting algorithm, a light beam may be emitted across the image data from each pixel of the image data, along a fixed direction (usually along a line of sight), color information corresponding to each pixel may be obtained, color values of pixels or voxels on the light beam may be accumulated based on a light absorption model. The accumulated color values may be the color of rendered virtual scene. Using the ray tracing/casting algorithm, a light beam may be emitted from each pixel. Then the light beam may travel along a straight line, and interact with each pixel in the virtual scene. The propagation path of the light, color of the light, and/or the intensity of the light may change according to the characteristic information of corresponding pixel(s) or voxel(s). Further, one or more light beams may gather to form the virtual scene.

In 712, a feedback force may be determined based on a collision detection. Step 712 may be performed by the feedback force determining unit 510. Through the collision detection, whether a pressure is applied on the model generated in 708 may be determined. The feedback force may be determined upon determining a collision between the model and a virtual device (e.g., the interaction device(s) 150). The collision detection may be performed based on a collision detection algorithm, including a hierarchical bounding volume algorithm, a space division algorithm, etc. Using the hierarchical bounding volume algorithm, the virtual object (e.g., the second ROI) may be bounded with a geometry, and a hierarchical bounding volume tree may be established based on characteristic information of the virtual object (e.g., gray value). The hierarchical bounding volume algorithm may include AABB bounding volume algorithm, Sphere bounding volume algorithm, OBB bounding volume algorithm, K-DOP bounding volume algorithm, etc. Using the space division algorithm, the virtual scene rendered in 710 may be divided into a plurality of cells with a same volume, and an interaction test may be performed on the virtual object (e.g., the second ROI) in the same cell or adjacent cells. The space division algorithm may include a quadtree algorithm, an octree algorithm, a K-D tree, a BSP algorithm, etc.

In some embodiments, the feedback force may be determined based on the deformation of the at least one model generated in 708 (e.g., a spring mass point model). The feedback force may be related to the press depth of the at least one node. In some embodiments, the deeper the press depth is, the greater the feedback force may be.

In some embodiments, the feedback force may be obtained by a force feedback device (e.g., the interaction device(s) 150, or the external device(s) 140). A user may sense the feedback force via the force feedback device.

In 714, interaction information may be obtained. Step 714 may be performed by the interacting unit 514. In some embodiments, the interaction information may be generated by a user and/or collected by the external device(s) 140, and/or the interaction device(s) 150. For example, the interaction information may include a motion data corresponding to a part of user body, such as hands, a head, eyes, a neck, etc. As another example, the interaction information may include data inputted by a user through the external device(s) 140, and/or the interaction device(s) 150. In some embodiments, the data inputted may include a text, a voice, an image, etc.

In some embodiments, the interaction information may be related to a virtual navigation in the virtual scene. In the virtual navigation, a virtual camera (also referred to as a viewpoint) may be applied to move in the virtual scene along a route (e.g., a center line of the virtual scene). In some embodiments, the virtual navigation may be performed automatically. For example, the virtual camera may move automatically based on a predetermined route and a predetermined parameter related to the virtual navigation. The predetermined route may be determined based on a center line of the virtual scene. The parameter related to the virtual navigation may include a direction of the viewpoint, a view angle, a position of the viewpoint, etc. In some embodiments, the virtual navigation may be performed semi-automatically. For example, the virtual camera may move along a center line of the virtual scene, and then a user may control the parameter related to the virtual navigation to change the motion of the virtual camera, such as the direction of motion, the position of the virtual camera, or the like, or a combination thereof. In some embodiments, the virtual navigation may be performed in response to human interactions with the virtual camera. For example, the virtual camera may be controlled to move by the interaction information, such as movements of the eyes, the hands or the head.

In 716, the virtual scene may be updated based on the interaction information. Step 716 may be performed by the updating unit 512. In some embodiments, the virtual scene rendered in 710 may represent the first ROI. The different parts corresponding to the first ROI may be in a same resolution represented in the virtual scene. Using updating, one or more parts of the first ROI in the virtual scene may be represented more clearly. In some embodiments, the shape of at least one portion of the virtual scene may be changed. For example, a virtual pressure may be applied on an ROI (e.g., the second ROI) represented in the virtual scene. The pressure may deform the ROI. The virtual scene may be updated according to the deformed ROI. When the virtual pressure is released from the ROI, the deformed virtual scene may be restored. In some embodiments, upon releasing the collision between one or more portions of the ROI and a virtual object, the virtual scene may be revisualized (or updated).

In some embodiments, the updating of the virtual scene may be achieved based on a virtual navigation. In a virtual navigation process, a virtual camera may move from a start point of a route to an end point of the route. A region closer to the virtual camera may be represented with high resolution in the virtual scene. A region far from the virtual camera may be represented with low resolution in the virtual scene. Then the virtual scene may be updated based on the position of the virtual camera. In some embodiments, an object of interest (e.g., the second ROI) may be in a view of the virtual camera, then the virtual scene may be updated to represent the object of interest clearly, such as scaling up the virtual scene.

In 718, the second ROI may be determined based on the feedback force. Step 718 may be performed by the ROI determining unit 504. In some embodiments, the second object corresponding to the second ROI may be generated based on the feedback force and the pre-determined second ROI. In some embodiments, the second object may be an abnormal tissue or a pathological tissue. The feedback force may be different relative to different second objects. The softer the second object is, the greater the feedback force may be. For example, the second object may be determined to be a polypus based on a determination that a feedback force is greater than the feedback force from a normal colon tissue. As another example, the second object may be determined to be a nodule based on a determination that the feedback force is smaller than the feedback force from a normal colon tissue.

In some embodiments, the feedback force may be transmitted to the interaction device(s) 150 (e.g., a force feedback device). The feedback force may be further processed and converted to a sensation signal by the VR device. In some embodiments, the sensation signal may assist a user or an operator to determine the second object corresponding to the second ROI. For example, a polypus that includes more fat and/or blood may sense softer and a nodule may sense less soft than normal colon tissue. As another example, a hyperplastic colon polypus may sense less soft than normal colon tissue. In some embodiments, a relationship model between the feedback force and different second objects (e.g., polypus, nodules, tumor, etc.) may be generated based on a machine learning technique. Further, the second ROI may be determined based on the relationship model. For example, characteristic information (e.g., shape, size, wettability, structure, etc.) related to the second object may be extracted, and a feedback force corresponding to a different second object may be acquired. Further, the characteristic information related to the second object and the corresponding feedback force may be used to generate the relationship model based on the machine learning technique.

It should be noted that the description of the process 700 is provided for the purposes of illustration, and not intended to limit the scope of the present disclosure. For persons having ordinary skills in the art, various variations and modifications may be conducted under the teaching of the present disclosure. However, those variations and modifications may not depart from the protecting of the present disclosure. For example, step 712 and step 714 may be performed synchronously. As another example, step 716 and step 718 may be performed synchronously. In some embodiments, step 702 may be optional.

Figure 8A:
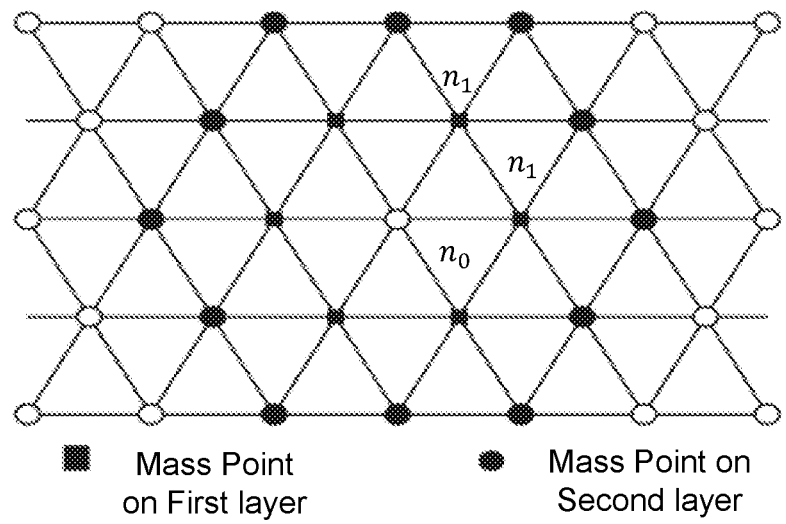
FIG. 8A and FIG. 8B are diagrams illustrating an exemplary spring-mass point model according to some embodiments of the present disclosure.
Figure 8B:
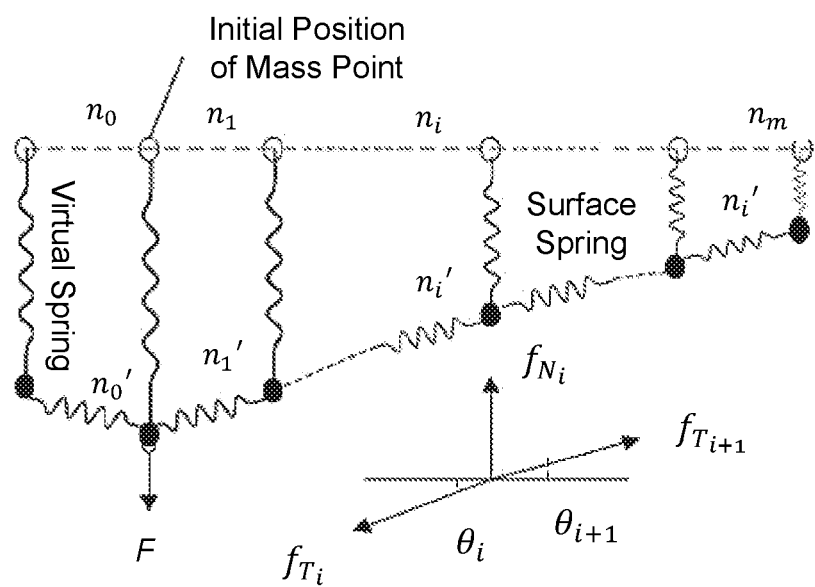

FIG. 8A and FIG. 8B are diagrams illustrating an exemplary spring-mass point model according to some embodiments of the present disclosure. As shown, a spring-mass point model with respect to an object (e.g., a soft tissue) may have a regular hexagon structure. The spring-mass point model may include multiple layers (e.g., a first layer, a second layer, etc.) with the same center (e.g., a mass point $n_0$). The mass point $n_0$ may be a force-bearing point. A collision may happen on the mass point $n_0$. The multiple layers may correspond to a series of concentric layers of the object. Each layer of the spring-mass point model may have a plurality of mass points located on it. Two adjacent mass points may be connected with one or more springs. The number of mass points and springs on each layer may be different. The number of mass points on the m th layer may be 6m, and the number of springs may be 6(2m−1). If a force is applied on the mass point $n_0$ in the first layer, the mass point $n_0$ may move from an initial position. The springs connected the mass point $n_0$ with the mass point(s) in a second layer may deform as the movement of the mass point $n_0$. Some of the springs may shrink, while some of the springs may stretch. The mass points on the second layer may move as the springs shrink or stretch. Further, the force applied on the mass point $n_0$ may be transmitted to other mass points on different layers via the springs, and then the spring-mass point model may deform. The deformation of the spring-mass point model may be equivalent to a deformation of an object surface. A feedback force may be generated with the deformation of the spring-mass point model. The feedback force generated from the mass points may be equivalent to a resultant of elastic force corresponding to springs on each layer. As shown in FIG. 8B, when a pressure is applied at the mass point $n_0$, the mass point $n_0$ may move away from the initial position. When the model is under balance, the position of the mass point $n_0$ may be changed to be a position of the mass point $n_0'$. At the position of the mass point $n_0'$, the feedback force generated on the mass point $n_0$ contributed by the mass points on the first layer may be determined based on a force balance relationship, as described in Equation (1):

$$F = f_{N_0} + 6f_{T_1} \sin \theta_1 = K_{N_0} \Delta Z_0 + 6 K_{T_1} \Delta r_1 \sin \theta_1. \tag{1}$$

where $f_{T_0}$ may represent the tangential force on the mass point $n_0$, $f_{N_0}$ may represent the normal force on the mass point $n_0$, $K_{N_0}$ may represent the elastic coefficient of springs connecting with the mass point $n_0$, $\Delta Z_0$ may represent the normal displacement of the mass point $n_0$, also referred to the press depth of the mass point $n_0$, $\theta_0$ may represent an angle of a line connecting the deformed mass points $n_0$ and $n_1$ in a horizontal direction.

For the ith layer, the feedback force in a tangential direction may be determined according to Equation (2):

$$6(2i-1)f_{T_i}\cos\theta_i = [12(i+1)-6]f_{T_{i+1}}\cos\theta_{i+1}. \quad (2)$$

The feedback force in a normal direction may be determined according to Equation (3):

$$6if_{N_i} = 6iK_{N_i}\Delta Z_i = 6(2i-1)f_{T_i}\sin\theta_i - [12(i+1)-6]f_{T_{i+1}}\sin\theta_{i+1}. \quad (3)$$

where $f_{T_i}$ may represent the tangential force, $f_{N_i}$ may represent the normal force, $K_{N_i}$ may represent the elastic coefficient of springs connecting with a mass point $n_i$, $\Delta Z_i$ may represent the normal displacement of the mass point $n_i$, also referred to the press depth of the mass point $n_i$, $\theta_i$ may represent an angle of a line connecting the deformed mass points $n_i$ and $n_{i-1}$ in a horizontal direction.

When m=i, according to Equations (1) and (3), the feedback force F generated on the mass point $n_0$ contributed by the mass points from the first layer to the ith layer may be:

$$F = f_{N_0} + 6f_{N_1} + \ldots + 6mf_{N_m}. \quad (4)$$

Further, $$F = K_{N_0}\Delta Z_0 + 6K_{N_1}\Delta Z_1 + \ldots + 6K_m\Delta Z_m + [12(m+1)-6]f_{T_{m+1}}\sin\theta_{m+1}. \quad (5)$$

In some embodiments, the press depth $\Delta Z_i$ may be related to the normal deformation of the springs on the ith layer. The feedback force F may be determined based on the press depth $\Delta Z_i$ corresponding to each mass point according to the Equation (5).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the spring-mass point model with respect to the object may have a square structure, a regular pentagon structure or other polygon structures.

Figure 9:
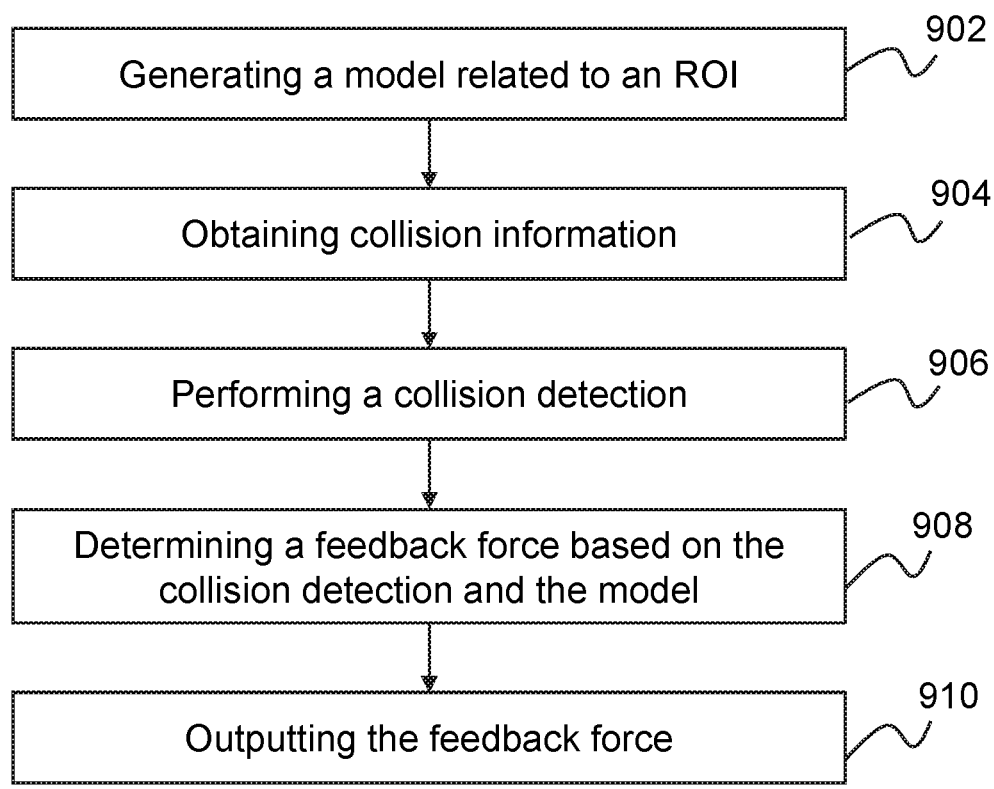
FIG. 9 is a flowchart illustrating an exemplary process for determining a feedback force according to some embodiments of the present disclosure.

FIG. 9 is a flowchart illustrating an exemplary process 900 for determining a feedback force according to some embodiments of the present disclosure. In some embodiments, step 712 illustrated in FIG. 7 may be performed according to process 900.

In 902, a physical model related to an ROI may be generated. Step 902 may be performed by the model generating unit 506. In some embodiments, the model may include a physical model as described elsewhere in the disclosure. The physical model may be identified based on a biomechanical property of an organ or tissue corresponding to the ROI. The biomechanical property may include elasticity, viscoelasticity, etc. Because of the elasticity or the viscoelasticity of organs or tissues, one or more physical behavior with a characteristic (e.g., a hysteresis, a relaxation, a creep deformation, an aeolotropy, a nonlinear stress-strain relation, etc.) may be generated if a force is imposed on the organs or tissues. For different organs or tissues, the elasticity and/or the viscoelasticity may be different. Then, the physical model may represent different physical characteristics (e.g., a feedback force, deformation, etc.) corresponding to different organs or tissues. In some embodiments, the physical model and a geometric model may be integrated into one single model. For example, a geometric model related to the ROI may be generated based on a 3D reconstruction technique as described elsewhere in the disclosure. Then the geometric model may be defined by one or more mass points. Two adjacent mass points may be connected with one or more springs to form a physical model. In some embodiments, the physical model may be identified based on the geometric model, but separated from the geometric model. For example, one or more parameters related to the physical model (e.g., elastic coefficient, number of mass points, etc.) may be determined based on characteristics of voxels (e.g., gray value, number of voxels, etc.) represented in the geometric model. Then the physical model may be generated according to the parameters related to the physical model.

In 904, collision information may be obtained. Step 904 may be performed by the feedback force determining unit 510. In some embodiments, a collision may be generated if a pressure is imposed on an ROI in a virtual scene (e.g., the virtual scene rendered in 710) via the interaction device(s) 150. The collision information may include one or more parameters with respect to the pressure. The parameters may include a value of the pressure, a direction of the pressure, a speed for applying the pressure, a position for bearing the pressure, etc. The parameters with respect to the pressure may be predetermined by a user or an operator.

In 906, a collision detection may be performed. Step 906 may be performed by the feedback force determining unit 510. In some embodiments, the collision detection may be performed to determine whether the collision happens between the ROI and a virtual object. In some embodiments, the virtual object may be controlled by a real object via the interaction device(s) 150. In some embodiments, the collision detection may be performed based on one or more collision detection algorithms as described in connection with FIG. 7.

In 908, a feedback force may be determined based on the detected collision and the physical model with respect to the ROI generated in 902. In some embodiments, step 908 may be performed by the feedback force determining unit 510. In some embodiments, the feedback force may be determined as described in connection with FIG. 8A and FIG. 8B.

In 910, the feedback force may be outputted. Step 910 may be performed by the interacting unit 514. In some embodiments, the feedback force may be outputted to a force feedback device. In some embodiments, the feedback force may be outputted to other haptic devices, such as smart gloves. In some embodiments, the outputted feedback force may be further processed. For example, the force feedback device may transfer the feedback force to a sensation signal, thus a user may sense the feedback force. In some embodiments, the feedback force may be transmitted to the ROI determining unit 504 for determining the ROI as described in connection with step 718.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, 902 may be omitted and the physical model may be obtained from the database 130 or any data source described in the present disclosure.

Figure 10:
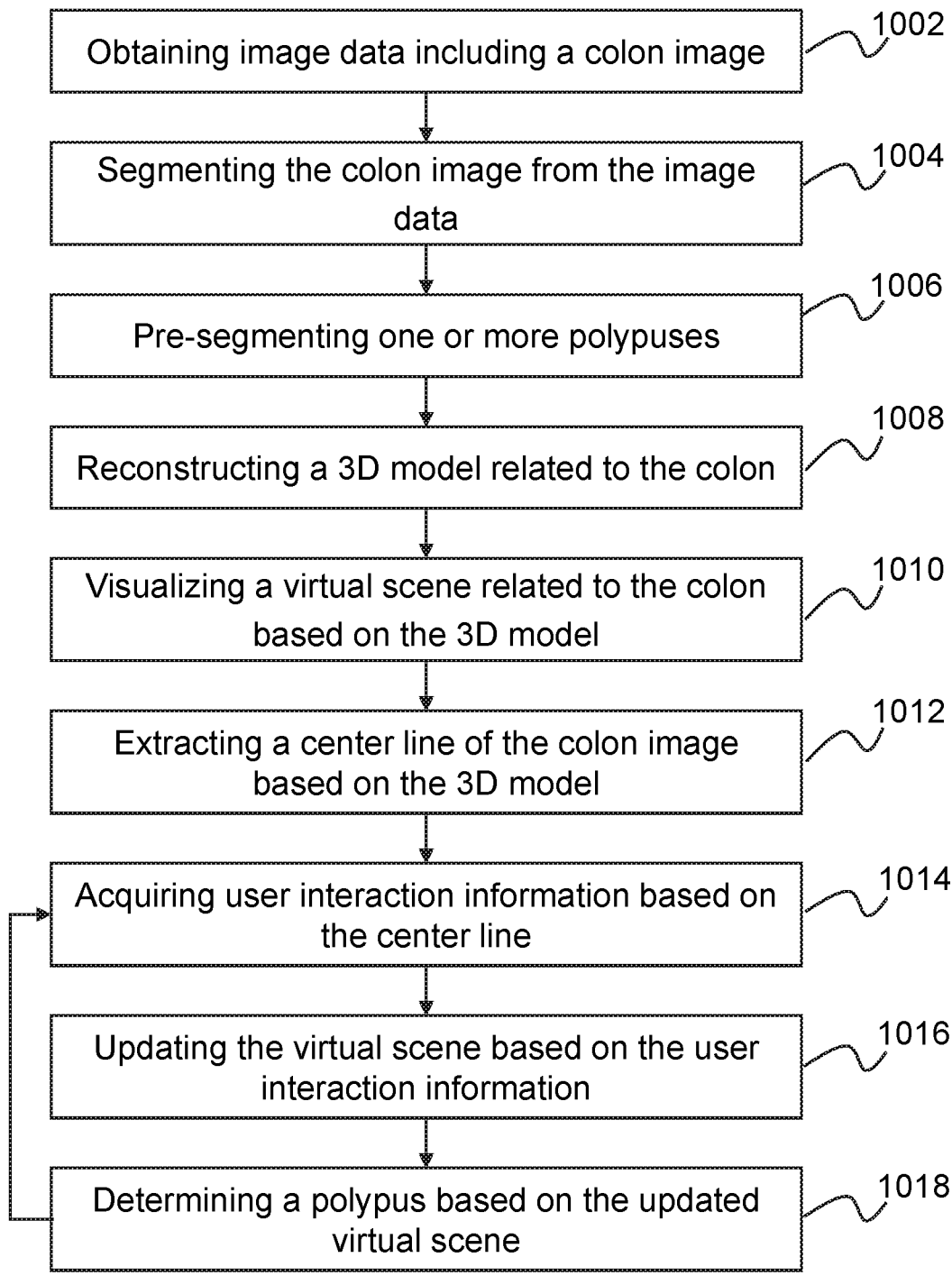
FIG. 10 is a flowchart illustrating an exemplary process for determining a polypus according to some embodiments of the present disclosure.

FIG. 10 is a flowchart illustrating an exemplary process 1000 for determining a polypus according to some embodiments of the present disclosure.

In 1002, image data including a colon image may be obtained. In some embodiments, step 1002 may be performed by the acquiring module 402. In some embodiments, the image data may be acquired as described in connection with step 602. The colon image may include a colon represented by a plurality of pixels/voxels in the image data.

In 1004, the colon image may be segmented from the image data. In some embodiments, step 1004 may be performed by the pre-processing unit 502, or the ROI determining unit 504. In some embodiments, the colon image may be segmented based on one or more segmentation techniques as described elsewhere in the disclosure. The segmentation of the colon image may include operations of enhancing, identifying, classifying, and/or, extracting the colon from other tissues or organs surrounding the colon represented by the image data, such as a small intestine, a liver tissue, a stomach, or a blood vessel around the colon.

In 1006, one or more polypuses may be pre-segmented. Step 1006 may be performed by the ROI determining unit 504. In some embodiments, the colon determined in 1004 may include one or more polypuses. In some embodiments, the polypus(es) may be pre-segmented manually, automatically, semi-automatically, or a combination thereof. For example, a user or an operator may draw a contour line of the polypus(es) using the external device(s) 140 (e.g., a mouse) manually. As another example, the polypus(es) may be pre-segmented automatically based on one or more segmentation techniques as described elsewhere in the disclosure. As a further example, a user or an operator may determine one or more points on or around the contour line of the polypus(es), and an interpolation operation may be performed based on the points to form the contour line of the polypus(es).

In 1008, a 3D model with respect to the colon may be reconstructed. Step 1008 may be performed by the model generating unit 506. In some embodiments, the 3D model may be a geometric model, or a combination model of the geometric model and a physical model as described elsewhere in the disclosure.

The 3D model with respect to the colon may be determined based on one or more 3D reconstruction techniques as described elsewhere in the disclosure. For example, the 3D model may be reconstructed based on a volume reconstruction technique. The volume reconstruction technique may be performed to apply a ray traversing each voxel in the 3D image data with respect to the colon, acquire multi-color values corresponding to voxels on the ray, and determine an integrated color value by composing the multi-color values based on voxels transparency. Then, the 3D model with respect to the colon may be reconstructed based on the integrated color values corresponding to multi-rays. In some embodiments, the volume reconstruction technique may be performed to reconstruct the 3D model in a first eye (e.g., a left eye) view and/or a second eye (e.g., a right eye) view. In some embodiments, the first eye view and the second eye view may be reconstructed simultaneously. For example, in a process for reconstructing the 3D model, if the ray source is located at the second eye, the rays may be emitted from the second eye. The 3D model may be reconstructed in the second eye view. If the ray source is located at the first eye, the rays may be emitted from the first eye. The 3D model may be reconstructed in the first eye view. The 3D model in the first eye view and the 3D model in the second eye view may be combined with each other to achieve an improved 3D effect.

In 1010, a virtual scene with respect to the colon may be visualized by rendering the 3D model reconstructed in 1008. Step 1010 may be performed by the virtual scene rendering unit 508. In some embodiments, the virtual scene with respect to the colon may include a realistic image, a sound, a motion, and other sensations that replicate the colon in a real environment. In some embodiments, the rendering of the 3D model may be realized using one or more visual rendering operations as described elsewhere in the disclosure. For example, an animation effect operation may be performed on the 3D model. The animation effect operation may represent the waves of the colon induced by breathing.

In 1012, a center line of the colon in the colon image may be extracted based on the 3D model reconstructed in 1008. In some embodiments, step 1012 may be performed by the pre-processing unit 502 or the model generating unit 506. The center line may traverse a center of the colon (or a 3D model of the colon). The center line may include a plurality of object points. An object point may be far away from the surface of the colon (or the 3D model of the colon) on different directions. The center line may be extracted by navigating in the virtual scene. In some embodiments, the center line may be extracted based on one or more center line extraction algorithms as described in the disclosure. For example, using a distance mapping algorithm, a shortest distance from each voxel inside the 3D model to a boundary of the 3D model in different directions may be determined. One or more object points may be determined based on the shortest distance. For example, one voxel with a same shortest distance to the boundary of the 3D model in different directions may be designated as an object point. The center line may be determined by connecting the object points.

In 1014, user interaction information may be acquired based on the center line extracted in 1012. Step 1014 may be performed by the interacting unit 514. In some embodiments, the user interaction information may include movements of a user's or operator's body, or a part of the body, such as rotations of a head or eyes, gestures, etc. In some embodiments, the user interaction information may be used to guide the navigation in the virtual scene. For example, the movements of eyes may be related to the movements of a virtual camera in the virtual scene. In some embodiments, the virtual camera may move based on the center line determined in 1012. The user interaction information may be used to control the virtual camera moving along the center line, or nearby the center line.

In 1016, the virtual scene may be updated based on the user interaction information acquired in 1014. In some embodiments, step 1016 may be performed by the updating unit 512 or by the virtual scene rendering unit 508. In some embodiments, the user interaction information (e.g., movements of user's eyes) may control positions of a virtual camera in the virtual scene. A region closer to the virtual camera may be represented in the virtual scene with high resolution, and a region far from the virtual camera may be represented with low resolution. The virtual scene may be updated to represent different regions based on the position of the virtual camera. In some embodiments, a user may input or select an ROI (e.g., the pre-segmented polypus(es) in 1006) via the external device(s) 140 and/or the interaction device(s) 150, and then the virtual scene may be updated to represent the ROI with high resolution.

In 1018, the polypus may be determined based on the updated virtual scene. Step 1018 may be performed by the ROI determining unit 504. In some embodiments, a user or an operator may not determine a property (e.g., inflammatory, neoplastic, diffusibility, etc.) of the polypus(es) pre-segmented in 1006 represented by the image data. The virtual camera may move along the center line to the region including the polypus(es) pre-segmented in 1006. Then the virtual scene may be updated to represent the pre-segmented polypus(es) with high resolution. The user may further diagnose the polypus(es) represented in the updated virtual scene.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, step 1008 and step 1010 may be integrated into one single step. In some embodiments, process 1000 may include pre-processing the image data. In some embodiments, process 1000 may further include unfolding an intestinal wall of the colon based on an interpolation operation as described elsewhere in the disclosure.

Figure 11:
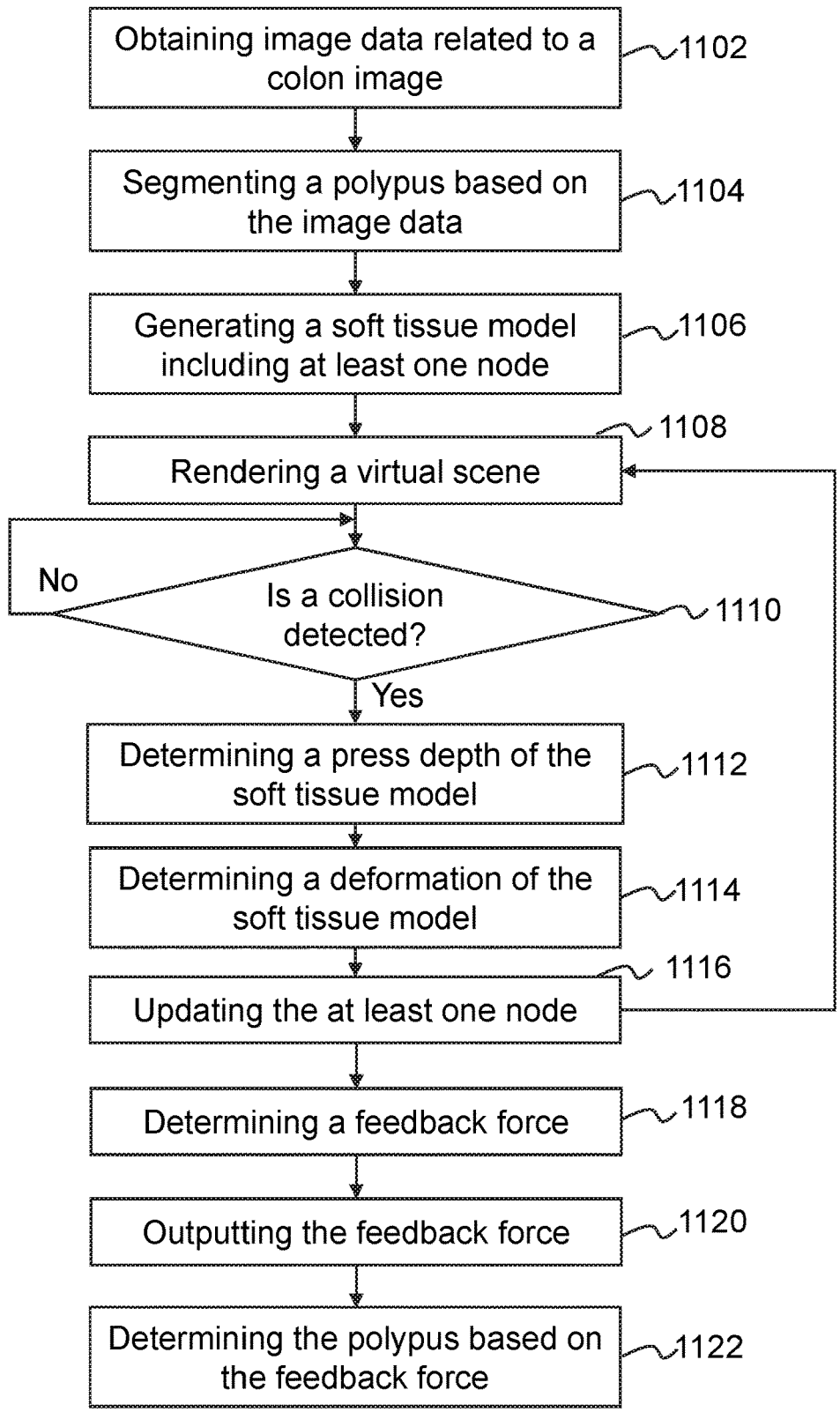
FIG. 11 is a flowchart illustrating an exemplary process for determining a polypus based on a feedback force according to some embodiments of the present disclosure.

FIG. 11 is a flowchart illustrating an exemplary process 1100 for determining a polypus based on a feedback force according to some embodiments of the present disclosure. In some embodiments, step 1112 through step 1118 may be performed in connection with FIG. 8A and FIG. 8B.

In 1102, image data with respect to a colon image may be obtained. Step 1102 may be performed by the acquiring module 402. In some embodiments, the image data may be obtained as described elsewhere in the disclosure. The colon image may include a colon represented by a plurality of pixels/voxels in the image data.

In 1104, a polypus may be segmented based on the image data. Step 1104 may be performed by the ROI determining unit 504. In some embodiments, the polypus may be segmented based on one or more segmentation techniques as described elsewhere in the disclosure.

In 1106, a soft tissue model including a plurality of nodes may be generated based on the colon. Step 1106 may be performed by the model generating unit 506. In some embodiments, the soft tissue model may be a physical model (e.g., a spring-mass point model as described in FIG. 8A), or a combination model of a geometric model and a physical model as described in connection with FIG. 7. For example, a geometric model with respect to the colon may be generated based on the image data. Further, a physical model may be generated based on the geometric model and/or integrated into the geometric model with respect to the colon. In some embodiments, the soft tissue model may be generated based on one or more biomechanical properties of the colon (e.g., elasticity, viscoelasticity, etc.). One or more parameters related to the soft tissue model may be determined based on the biomechanical properties of the colon. For example, the soft tissue model may be a spring-mass point model as described in FIG. 8A. The soft tissue model may include one or more mass points. Two adjacent mass points may be connected by one or more springs. The softer the colon is, the larger the elastic coefficient of the springs may be.

The soft tissue model may represent structure information and/or physical characteristic information of the colon. For example, the soft tissue model may represent 3D structure information of the colon, such as a shape, a size, a texture, a color, or the like, or a combination thereof. As another example, the soft tissue model may represent a mechanical property of the colon, such as deformation, motion, mass, etc. The geometric model with respect to the colon may be rendered based on one or more 3D reconstruction techniques as described elsewhere in the disclosure. In some embodiments, the soft tissue model may include a first model and/or a second model. The first model may include structure information for reconstructing one or more portions of the image data (e.g., a ROI) based on the image data. The second model may relate to one or more portions of the image data (e.g., a ROI). In some embodiments, the second model may be a mechanical model for one or more soft tissues. The second model may include one or more nodes.

In 1108, a virtual scene may be rendered. Step 1108 may be performed by the virtual scene rendering unit 508. In some embodiments, the virtual scene may be built based on the image data with respect to the colon obtained in 1102 using one or more volume reconstruction techniques as described elsewhere in the disclosure. In some embodiments, the virtual scene may be rendered based on the soft tissue model (e.g., a geometric model) generated in 1106. For example, if the soft tissue model is a combination model including a geometric model and a physical model, the virtual scene may be visualized by rendering the soft tissue model based on one or more visual rendering operations as described elsewhere in the disclosure.

In 1110, whether a collision is detected may be determined. Step 1110 may be performed by the feedback force determining unit 510. If a collision is detected, process 1100 may proceed to step 1112. If a collision is not detected, process 1100 may re-perform 1110 or may be suspending until a collision may be detected. In some embodiments, the collision may be detected based on one or more collision detection algorithms as described elsewhere in the disclosure. In some embodiments, the collision may happen if a pressure is imposed on the soft tissue model generated in 1106. The pressure may be a virtual pressure, such as a pressure value and/or a pressure position preset and/or inputted by a user or operator via the external device(s) 140 (e.g., a keyboard). In some embodiments, a user may apply a pressure on the interaction device(s) 150 (e.g., a pressure sensor device), and the pressure may be converted to an electric signal and transmitted to the feedback force determining unit 510. Then, the electric signal may be applied to the soft tissue model, which may be equivalent to imposing a pressure on the soft tissue model.

In 1112, a press depth corresponding to the nodes of the soft tissue model may be determined. Step 1112 may be performed by the feedback force determining unit 510. In some embodiments, the pressure may be imposed on a node of the soft tissue model. The press depth may refer to a displacement of the node in the normal direction of the pressure, for example, the normal displacement of a mass point from the point $n_0$ to the point $n_0'$ as illustrated in FIG. 8B. The normal displacement of the node may be determined based on the deformation of spring(s) connected with the node.

In 1114, a deformation of the soft tissue model may be determined based on the press depth determined in 1112. Step 1114 may be performed by the feedback force determining unit 510. In some embodiments, the deformation of the soft tissue model may be determined based on the press depths (also referred to as normal displacements) of the nodes in the soft tissue model. In some embodiments, nodes at different positions in the soft tissue model may have different normal displacement.

In 1116, at least one node may be updated. Step 1116 may be performed by the updating unit 512. The normal displacement of a node may induce position change of the node in the soft tissue model. The position of the node(s) may be updated based on the press depth determined in 1112 and/or the deformation of the soft tissue model determined in 1114. For example, the soft tissue model may include a spring-mass point model including one or more mass points and springs as described in connection with FIG. 8A and FIG. 8B. The nodes may be also referred to as mass points. If a force is imposed on the spring-mass point model, the spring-mass point model may be deformed. The positions corresponding to different mass points may be updated. In some embodiments, one or more nodes may be removed from the soft tissue model. The removed nodes may be non-contributive to the deformation of the soft tissue model when a pressure is imposed on the soft tissue model. For example, one or more mass points (e.g., the mass points far from the spring-mass point model) may be removed from the spring-mass point model.

In 1118, a feedback force may be determined based on the press depth corresponding to the nodes. Step 1118 may be performed by the feedback force determining unit 510. In some embodiments, the feedback force may be related to the press depth corresponding to the node(s). The larger the press depth is, the greater the feedback force may be. In some embodiments, the feedback force may be determined as Equation (5).

In 1120, the feedback force may be outputted. Step 1120 may be performed by the interacting unit 514. In some embodiments, the feedback force may be further processed by the interaction device(s) 150 (e.g., a force feedback device). For example, the interaction device(s) 150 may process and/or convert the feedback force into a sensation signal.

In 1122, the polypus segmented in 1104 may be determined based on the feedback force. Step 1122 may be performed by the ROI determining unit 510. In some embodiments, the outputted feedback force may be converted into a sensation signal for a user. For example, the polypus may sense softer than nodules. The user may determine that the polypus segmented in 1104 is real polypus or other tissues such as nodules based on the sensation signal. In some embodiments, the outputted feedback force may be used to identify a relationship between a feedback force and different tissues or organs. The feedback force of different tissues or organs may be different when other conditions (e.g., a pressure, a speed of applying the pressure, a direction of the pressure, etc.) are the same.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, step 1114 and step 1118 may be performed simultaneously. In some embodiments, process 1000 may include preprocessing the image data. In some embodiments, process 1000 may further include unfolding an intestinal wall of the colon based on an interpolation operations as described elsewhere in the disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method implemented on a computing device having at least one processor and a storage medium, the method comprising:
    obtaining image data related to a first ROI, the first ROI including a soft tissue represented by a plurality of voxels, each of the plurality of voxels having a voxel value;
    visualizing a first virtual scene based on the image data, the first virtual scene revealing at least one portion of the first ROI;
    performing a collision detection between the at least one portion of the first ROI and a virtual object in the first virtual scene based on a soft tissue model;
    determining a feedback force from the at least one portion of the first ROI based on the soft tissue model, the soft tissue model including an integration of a geometric model and a physical model, the geometric model including a plurality of meshes and the plurality of meshes including a series of nodes, one or more nodes being defined as mass point of the physical model, and two or more adjacent mass points being connected by one or more springs to form the physical model;
    identifying a second ROI from the first ROI based on the feedback force and a relationship model between feedback forces and characteristic information of different objects, the second ROI being related to the soft tissue in the first ROI;
    determining, based on the feedback force corresponding to the second ROI, whether the soft tissue is an abnormal tissue; and
    causing a virtual reality device to convert the feedback force to a sensation signal, the sensation signal assisting a user to determine whether the soft tissue is an abnormal tissue.

2. The method of claim 1, wherein visualizing the first virtual scene further comprises:
    determining the geometric model, the geometric model including structure information for reconstructing at least one portion of the image data, wherein the at least one portion of the image data includes the at least one portion of the first ROI; and
    building the first virtual scene based on the geometric model and the image data.

3. The method of claim 2, wherein visualizing the first virtual scene further comprises:
    determining a first image with respect to the first ROI in a first eye view and a second image with respect to the first ROI in a second eye view; and
    displaying the first virtual scene based on the first image and the second image.

4. The method of claim 1, wherein performing the collision detection further comprises:
    determining the physical model related to the first ROI, the physical model-being a mechanical model for the soft tissue, the physical model including the plurality of nodes;
    determining the soft tissue model based on the physical model and the geometric model; and
    determining a press depth of the at least one portion of the first ROI induced by the virtual object based on the soft tissue model.

5. The method of claim 4, wherein determining the feedback force from the at least one portion of the first ROI based on the collision detection comprises:

determining the feedback force based on the press depth and the voxel values associated with the at least one portion of the first ROI.

6. The method of claim 5, further comprising:
determining deformation of the at least one portion of the first ROI based on the press depth and the second model;
updating at least one of the plurality of nodes of the second model; and
rendering a second virtual scene based on the updated plurality of nodes, the second virtual scene revealing the at least one portion of the first ROI with deformation.

7. The method of claim 6, further comprising:
revisualizing the first virtual scene upon releasing the collision between the at least one portion of the first ROI and the virtual object.

8. The method of claim 1, wherein the virtual object is controlled by a real object via an interaction device.

9. The method of claim 8, wherein the real object is a portion of a human body.

10. The method of claim 1, further comprising:
outputting the feedback force through a force feedback device.

11. The method of claim 1, further comprising:
obtaining user interaction information associated with the first virtual scene from an interaction device; and
rendering a third virtual scene based on the user interaction information and the image data.

12. The method of claim 1, wherein the first ROI includes a colon, and the second ROI includes one and more polypuses.

13. The method of claim 12, further comprising:
pre-processing the image data, the pre-process including at least one of:
purging an electronic gut of the image data;
segmenting a colon image from the image data to obtain the first ROI;
extracting a center line of the colon image; or
unfolding an intestinal wall of the colon image.

14. A method implemented on a computing device having at least one processor and a storage medium, the method comprising:
obtaining image data related to an ROI, the ROI including a colon represented by a plurality of voxels;
building a first virtual scene based on the image data, the first virtual scene revealing at least one portion of the ROI;
displaying the first virtual scene by a reality display device;
acquiring user interaction information associated with the first virtual scene from an interaction device, the user interaction information being generated in a virtual navigation in the first virtual scene that is performed using a virtual camera based on a first eye view and a second eye view; and
rendering a second virtual scene based on the user interaction information and the image data;
controlling a position of the virtual camera in the virtual scene based on the user interaction information, a region closer to the virtual camera being represented in the virtual scene with a high resolution, and a region far from the virtual camera being represented with a low resolution.

15. The method of claim 14, wherein building the first virtual scene based on the image data comprises:

Determining a 3D model, the 3D model including structure information for reconstructing the ROI based on the image data; and
rendering the first virtual scene based on the 3D model and the image data.

16. The method of claim 14, wherein building the first virtual scene comprises:
determining a first image in the first eye view with respect to the first ROI and a second image in the second eye view with respect to the first ROI; and
building the first virtual scene based on the first image and the second image.

17. The method of claim 14, wherein the reality display device includes at least one of a head-mounted display (HMD) device, a handheld device, or a smart glass.

18. The method of claim 14, further comprising:
pre-processing the image data, the pre-process including at least one of:
purging an electronic gut of the image data;
segmenting the colon image from the image data to obtain the ROI;
extracting a center line of the colon image; or
unfolding an intestinal wall of the colon image.

19. A system, comprising:
at least one storage medium storing a set of instructions; and
at least one processor in communication with the at least one storage medium, wherein when executing the set of instructions, the at least one processor is configured to cause the system to:
obtain image data related to a first ROI, the first ROI including soft tissue represented by a plurality of voxels, each of the plurality of voxels having a voxel value;
visualize a first virtual scene based on the image data, the first virtual scene revealing at least one portion of the first ROI;
perform a collision detection between the at least one portion of the first ROI and a virtual object in the first virtual scene based on a soft tissue model;
determine a feedback force from the at least one portion of the first ROI based on the soft tissue model, the soft tissue model including an integration of a geometric model and a physical model, the geometric model including a plurality of meshes and the plurality of meshes including a series of nodes, one or more nodes being defined as mass point of the physical model, and two or more adjacent mass points being connected by one or more springs to form the physical model;
identify a second ROI from the first ROI based on the feedback force and a relationship model between feedback forces and characteristic information of different objects, the second ROI being related to the soft tissue in the first ROI;
determining, based on the feedback force corresponding to the second ROI, whether the soft tissue is an abnormal tissue; and
cause a virtual reality device to convert the feedback force to a sensation signal, the sensation signal assisting a user to determine whether the soft tissue is an abnormal tissue.

20. The system of claim 19, the at least one processor is further configured to cause the system to:
obtain user interaction information associated with the first virtual scene from an interaction device; and render a third virtual scene based on the user interaction information and the image data.

\* \* \* \* \*